United States Patent
Yokota

(10) Patent No.: US 8,845,120 B2
(45) Date of Patent: Sep. 30, 2014

(54) LIGHT SOURCE UNIT, LIGHTING DEVICE, DISPLAY DEVICE AND TELEVISION RECEIVER

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 540 days.

(21) Appl. No.: 13/380,993

(22) PCT Filed: May 18, 2010

(86) PCT No.: PCT/JP2010/058333

§ 371 (c)(1),
(2), (4) Date: Jan. 10, 2012

(87) PCT Pub. No.: WO2011/001752

PCT Pub. Date: Jan. 6, 2011

(65) Prior Publication Data

US 2012/0099026 A1    Apr. 26, 2012

(51) Int. Cl.
*G09F 13/04* (2006.01)
*G02B 19/00* (2006.01)

(52) U.S. Cl.
CPC ........ *G02B 19/0028* (2013.01); *G02B 19/0061* (2013.01)
USPC ......... 362/97.3; 362/634; 362/97.1; 362/633; 362/632

(58) Field of Classification Search
CPC ...................... G02B 19/0061; G02F 1/133608
USPC .......................... 362/97.1–97.4, 632–634, 613
See application file for complete search history.

(56) References Cited

U.S. PATENT DOCUMENTS

| | | | |
|---|---|---|---|
| 7,204,604 B2 * | 4/2007 | Chou | 362/227 |
| 8,425,070 B2 * | 4/2013 | Shin | 362/97.3 |
| 8,568,014 B2 * | 10/2013 | Kim | 362/634 |
| 8,634,042 B2 * | 1/2014 | Park | 349/73 |
| 8,657,458 B2 * | 2/2014 | Matsumoto | 362/97.1 |
| 8,690,371 B2 * | 4/2014 | Takeuchi | 362/97.1 |
| 2008/0037288 A1 * | 2/2008 | Kim | 362/634 |
| 2008/0303977 A1 | 12/2008 | Sekiguchi et al. | |
| 2013/0141896 A1 * | 6/2013 | Li et al. | 362/97.3 |

FOREIGN PATENT DOCUMENTS

| | | |
|---|---|---|
| JP | 2007-048883 A | 2/2007 |
| JP | 2008-300277 A | 12/2008 |
| JP | 2008-304839 A | 12/2008 |
| JP | 2009-076456 A | 4/2009 |
| JP | 2009-087879 A | 4/2009 |

OTHER PUBLICATIONS

Official Communication issues in International Patent Application No. PCT/JP2010/058333, mailed on Jul. 13, 2010.
English machine translation of JP 2007-048883.
English machine translation of JP 2008-300277.
English machine translation of JP 2008-304839.

* cited by examiner

*Primary Examiner* — Anabel Ton
(74) *Attorney, Agent, or Firm* — Keating & Bennett, LLP

(57) ABSTRACT

An LED unit U of the present invention includes an LED 17 that is a light source, a diffuser lens 19, a board reflection sheet 23 and a restriction member 27. The diffuser lens 19 is provided to face a light emitting surface 17*a* of the LED 17. The board reflection sheet 23 is provided to face a surface of the diffuser lens 19 that is closer to the LED 17 and is configured to reflect light. The restriction member 27 projects from the diffuser lens 19 toward the board reflection sheet 23 and restricts positional relationship between the diffuser lens 19 and the board reflection sheet 23.

41 Claims, 29 Drawing Sheets

FIG.1
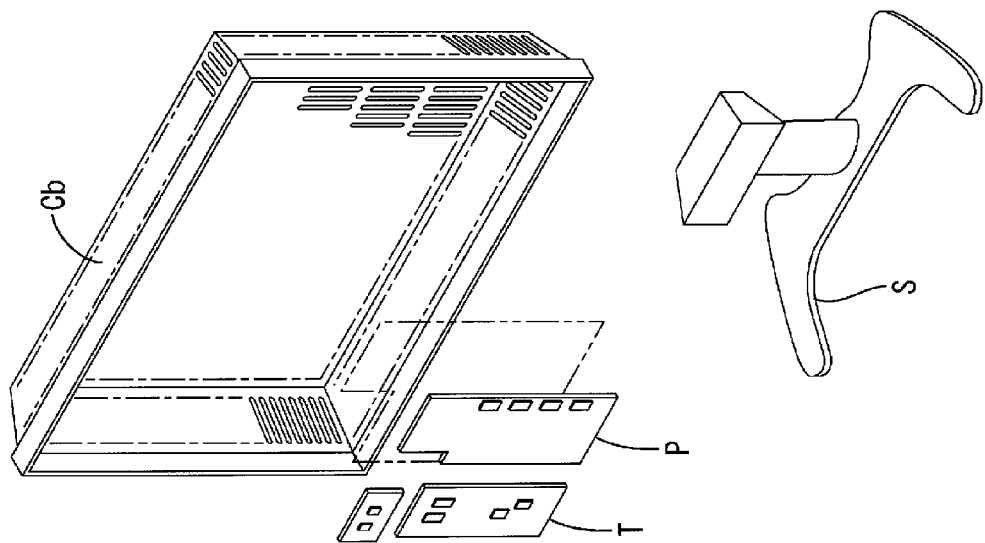
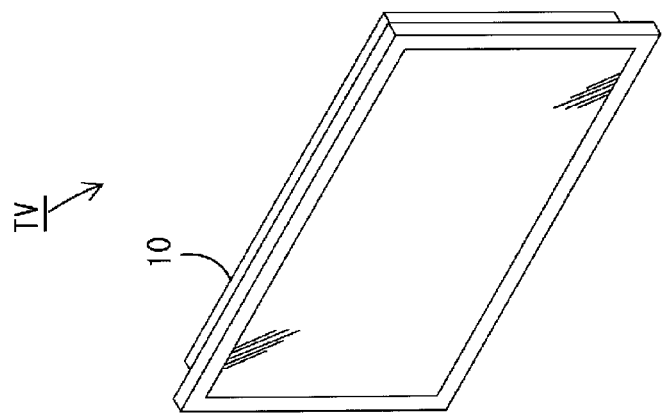
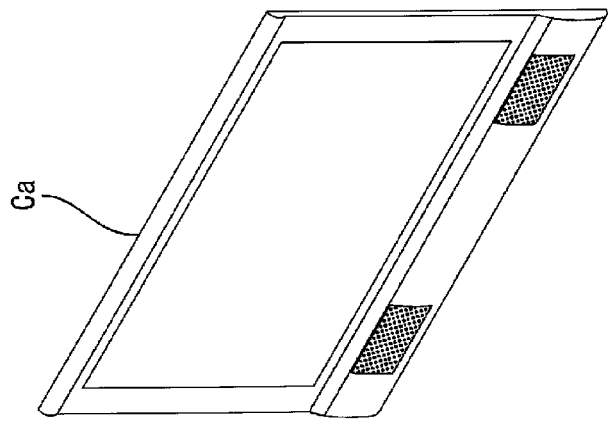

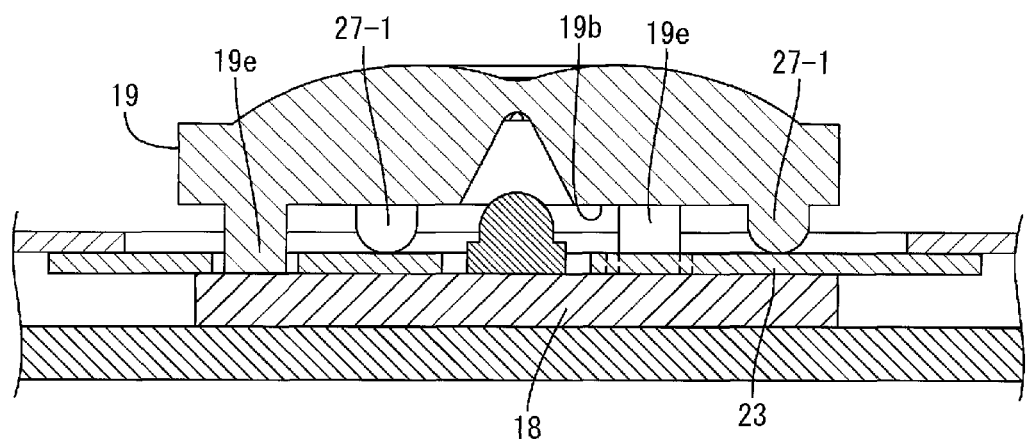
FIG.18
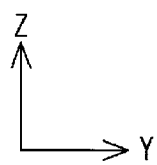

FIG.23
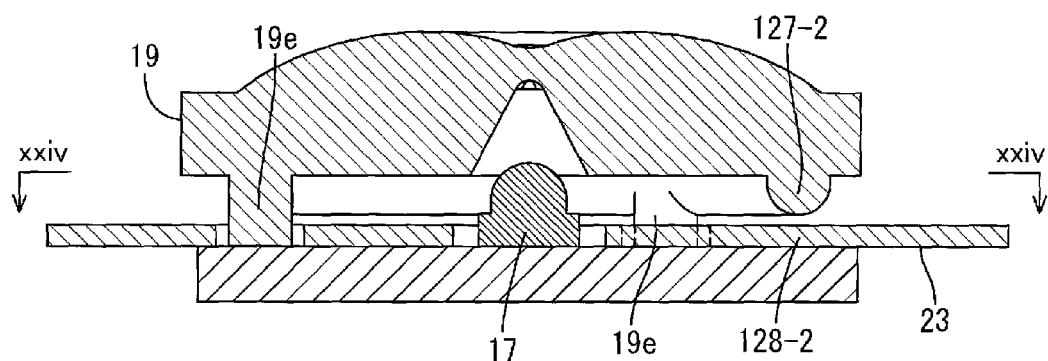
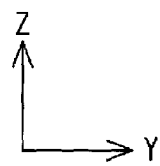

FIG.25
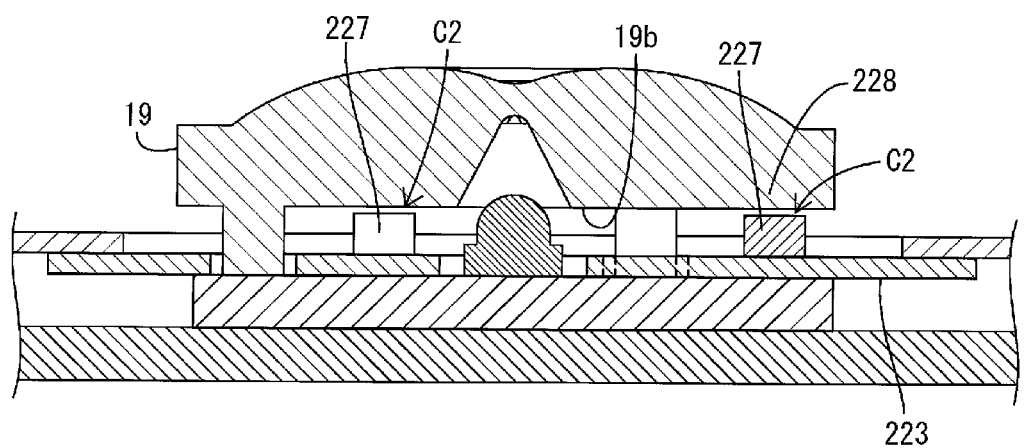
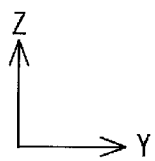

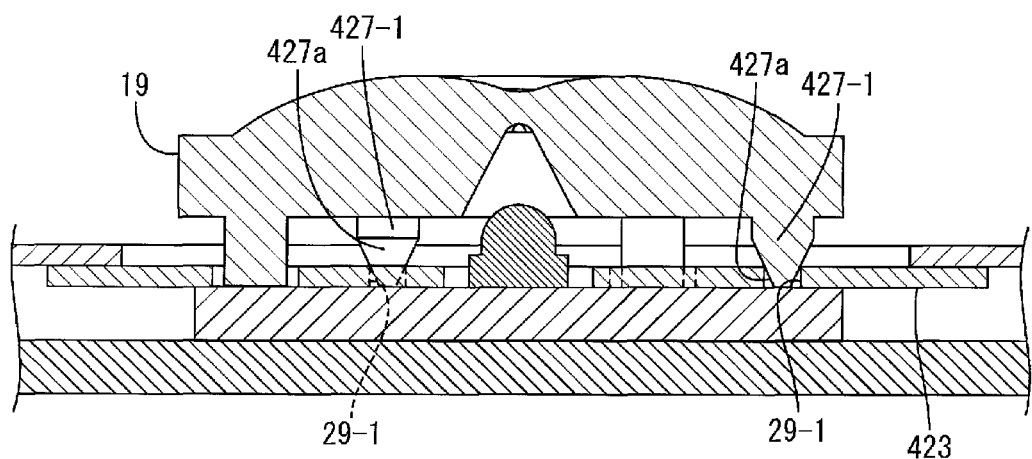
FIG.28
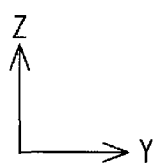

FIG.29
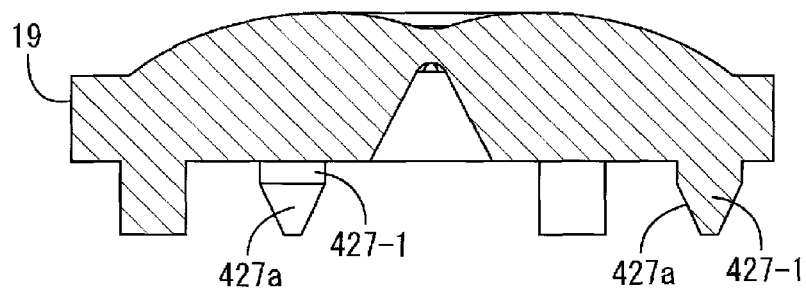
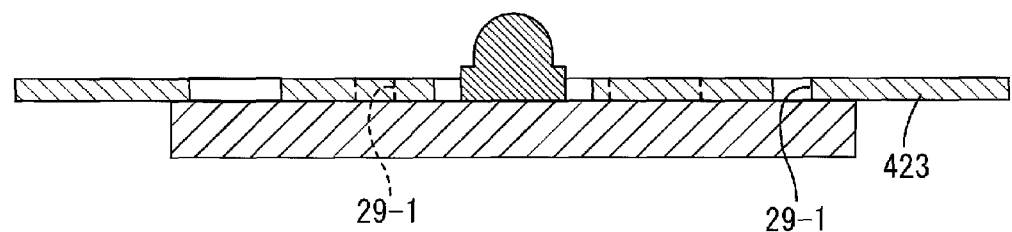

LIGHT SOURCE UNIT, LIGHTING DEVICE, DISPLAY DEVICE AND TELEVISION RECEIVER

TECHNICAL FIELD

The present invention relates to a light source unit, a lighting device, a display device and a television receiver.

BACKGROUND ART

For example, a liquid crystal panel used for a liquid crystal display device such as a liquid crystal television does not emit light, and thus a backlight unit is required as a separate lighting device. The backlight unit is known, which is arranged behind the liquid crystal panel (on aside opposite to a display surface side). The backlight unit includes a chassis having an opening on its surface side facing the liquid crystal panel, a light source housed in the chassis and an optical member (such as a diffuser sheet) provided in the opening of the chassis for effectively exit light emitted from the light source toward the liquid crystal side. light sources (for example, LEDs).

LEDs may be used for the light source and in such a case, an LED board on which the LEDs are mounted is housed in the chassis. The light emitted from the LEDs tends to have high directivity. Therefore, a diffuser lens may be provided for each LED to lower the directivity. The diffuser lenses are provided on the LED board. A backlight device including the LEDs and the diffuser lenses disclosed in Patent Document 1 has been known.

Patent Document 1: Japanese Unexamined Patent Publication No. 2008-304839

Problem to be Solved by the Invention

In case of using the diffuser lenses, all of rays of light emitted from the LEDs do not necessarily enter the diffuser lenses and exits therefrom, and at least a part of the rays of light may be reflected by the diffuser lenses and directed toward the LED board. To deal with this situation, the present inventor uses a configuration of providing a reflection member between the diffuser lenses and the LED board. Accordingly, the light that is reflected by the diffuser lens toward the LED board side is reflected by the reflection member again toward the diffuser lens to use the light emitted from the light source effectively.

The reflection member may be provided on the LED board with a double-sided adhesive tape. However, in such a case, if the reflection member may be thermally expanded or contracted, warping or distortion may occur intensively in the portions of the reflection member that are not fixed by the double-adhesive tape or that have low fixing force, and this may cause local deformation. This may cause unevenness in the light reflected by the reflection member and cause unevenness in the light exiting from the diffuser lenses.

To prevent the above problems, it can be proposed that the reflection member is not fixed to the LED board. However, if so, the position relationship between the diffuser lenses and the reflection member becomes unstable. For example, if the reflection member is slanted, the light reflected by the reflection member may be unnecessarily angled. This may cause unevenness in a distribution of light that is reflected by the reflection member and enters the diffuser lenses and this may cause unevenness in the light exiting from the diffuser lenses. Accordingly, desired optical ability may not obtained.

DISCLOSURE OF THE PRESENT INVENTION

The present invention was accomplished in view of the above circumstances. It is an object of the present invention to stably achieve desired optical ability.

Means for Solving the Problem

To solve the above problem, a light source unit of the present invention includes a light source having a light emitting surface, an optical component provided to face the light emitting surface, a reflection member provided to face a surface of the optical component that is close to the light source and configured to reflect light, and a restriction member projecting from one of the optical component and the reflection member toward another one of the optical component and the reflection member and configured to restrict positional relationship between the optical component and the reflection member.

Accordingly, light emitted from the light source passes through the optical component facing the light emitting surface and this applies optical effects to the light and the light that has received the optical effects exits from the optical component. Some of the light emitted from the light source may be reflected by the optical component and returned to the light source side. Such light is reflected by the reflection member and returned to the optical component side again to be effectively used. The distribution of light reflected by the reflection member and entering the optical component may change according to the positional relationship between the optical component and the reflection member. In the present invention, the restriction member projecting from one of the optical component and the reflection member toward the another one of the optical component and the reflection member restricts the positional relationship between the optical component and the reflection member. Therefore, the distribution of light reflected by the reflection member and entering the optical component is less likely to change and this stabilizes the distribution of light exiting from the optical component.

BRIEF DESCRIPTION OF THE DRAWINGS

FIG. 1 is an exploded perspective view illustrating a general configuration of a television receiver according to a first embodiment of the present invention;

FIG. 18 is a cross-sectional view illustrating an LED unit according to a first modification of the first embodiment taken along the Y-axis direction;

FIG. 23 is a cross-sectional view illustrating an LED unit according to a second modification of the second embodiment taken along the Y-axis direction;

FIG. 25 is a cross-sectional view illustrating an LED unit according to a third embodiment of the present invention taken along the Y-axis direction;

FIG. 28 is a cross-sectional view illustrating an LED unit according to a first modification of the fifth embodiment taken along the Y-axis direction; and FIG. 29 is a cross-sectional view illustrating an LED unit before providing a diffuser lens thereto taken along the Y-axis direction.

BEST MODE FOR CARRYING OUT THE INVENTION

First Embodiment

A first embodiment of the present invention will be described with reference to FIGS. 1 to 17. In the present embodiment, a liquid crystal display device 10 will be explained. An X axis, a Y-axis and a Z-axis are described in a part of the drawings, and a direction of each axial direction corresponds to a direction described in each drawing. An upper side in FIGS. 4 and 5 corresponds to a front-surface side and a lower side in FIGS. 4 and 5 corresponds to a rear-surface side.

As illustrated in FIG. 1, the television receiver TV of the present embodiment includes the liquid crystal display device 10, front and rear cabinets Ca, Cb which house the liquid crystal display device 10 therebetween, a power source P, a tuner T and a stand S. An entire shape of the liquid crystal display device (display device) 10 is a landscape rectangular.

Figure 2:
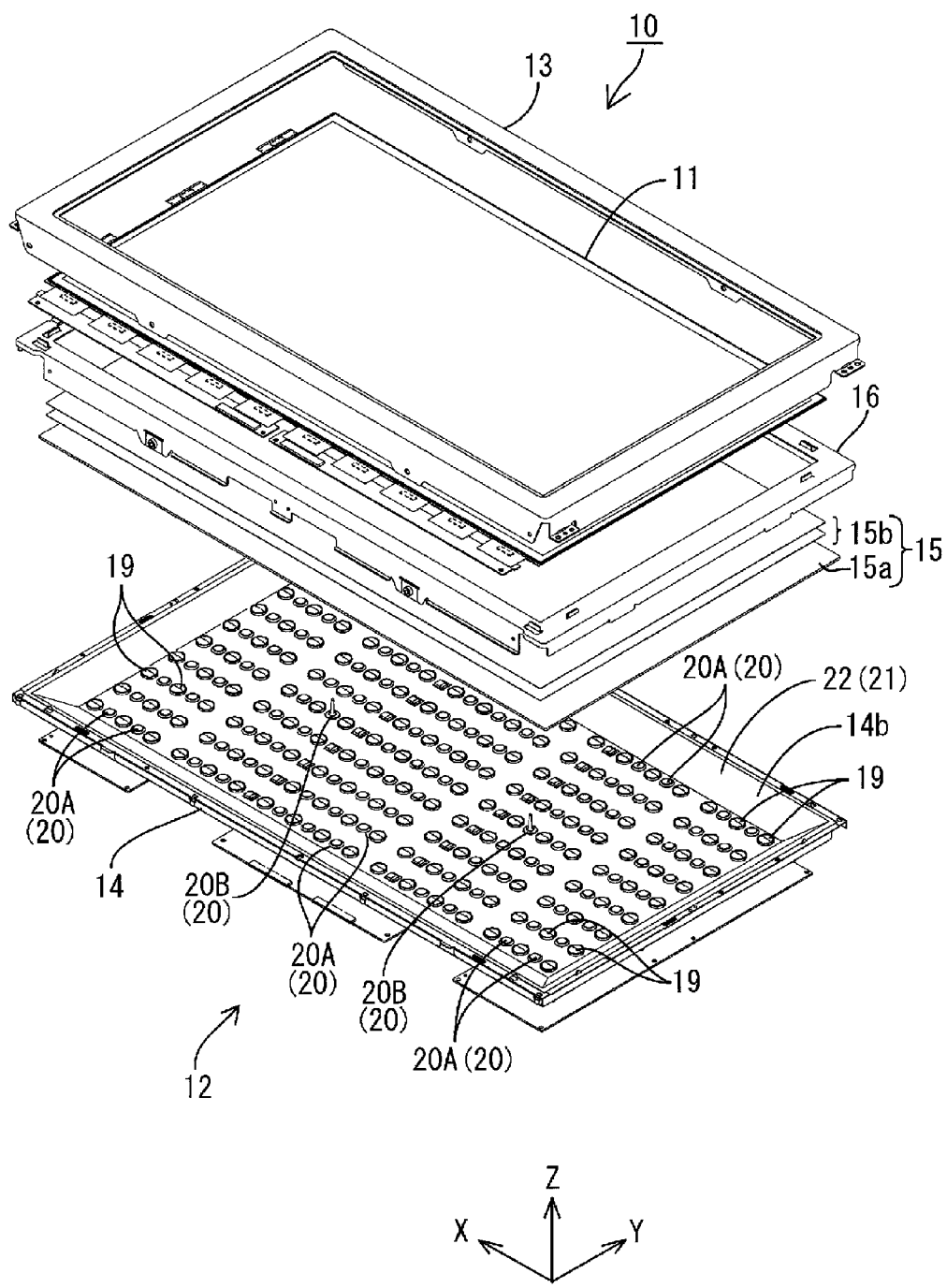
FIG. 2 is an exploded perspective view illustrating a general configuration of a liquid crystal display device included in the television receiver.

The liquid crystal display device 10 is housed in a vertical position. As illustrated in FIG. 2, the liquid crystal display device 10 includes a liquid crystal panel 11 as a display panel, and a backlight device (lighting device) 12 as an external light source. The liquid crystal panel 11 and the backlight device 12 are integrally held by a frame shaped bezel 13 and the like. In the present embodiment, a display size is 42 inches and an aspect ration is 16:9.

Next, the liquid crystal panel 11 and the backlight device 12 included in the liquid crystal display device 10 will be described. The liquid crystal panel (display panel) 11 is formed in a rectangular shape with a plan view and is configured such that a pair of glass substrates is bonded together with a predetermined gap therebetween and liquid crystal is sealed between the glass substrates. On one of the glass substrates, switching components (for example, TFTs) connected to source lines and gate lines which are perpendicular to each other, pixel electrodes connected to the switching components, and an alignment film and the like are provided. On the other substrate, color filters having color sections such as R (red), G (green) and B (blue) color sections arranged in a predetermined pattern, counter electrodes, and an alignment film and the like are provided. Polarizing plates are attached to outer surfaces of the substrates.

The backlight device 12 will be explained in detail. As illustrated in FIG. 2, the backlight device 12 includes a chassis 14, an optical sheet set 15 (a diffuser (light diffusing member) 15a, and a plurality of optical sheets 15b which is provided between the diffuser 15a and the liquid crystal panel 11), a frame 16, and a reflection sheet 21. The chassis 14 has a substantially box-shape and has an opening 14b on the light exit side (on the liquid crystal panel 11 side). The optical sheet set 15 is provided so as to cover the opening 14b of the chassis 14. The frame 16 provided along an outer edge of the chassis 14 holds an outer edge of the optical sheet set 15 such that the outer edge is sandwiched between the frame 16 and the chassis 14. The reflection sheet 21 reflects light in the chassis 14 to the optical member 15 side. Furthermore, an LED unit U (light source unit) including LEDs 17 (light emitting diodes) that are a light source is arranged in the chassis 14. Holding members 20 are provided to hold the LED unit U to the chassis 14. In the backlight device 12, a light exit side of the backlight device 12 is a side closer to the diffuser 15a than the LED unit U (front surface side). In the following, each component of the backlight device 12 will be explained.

Figure 3:
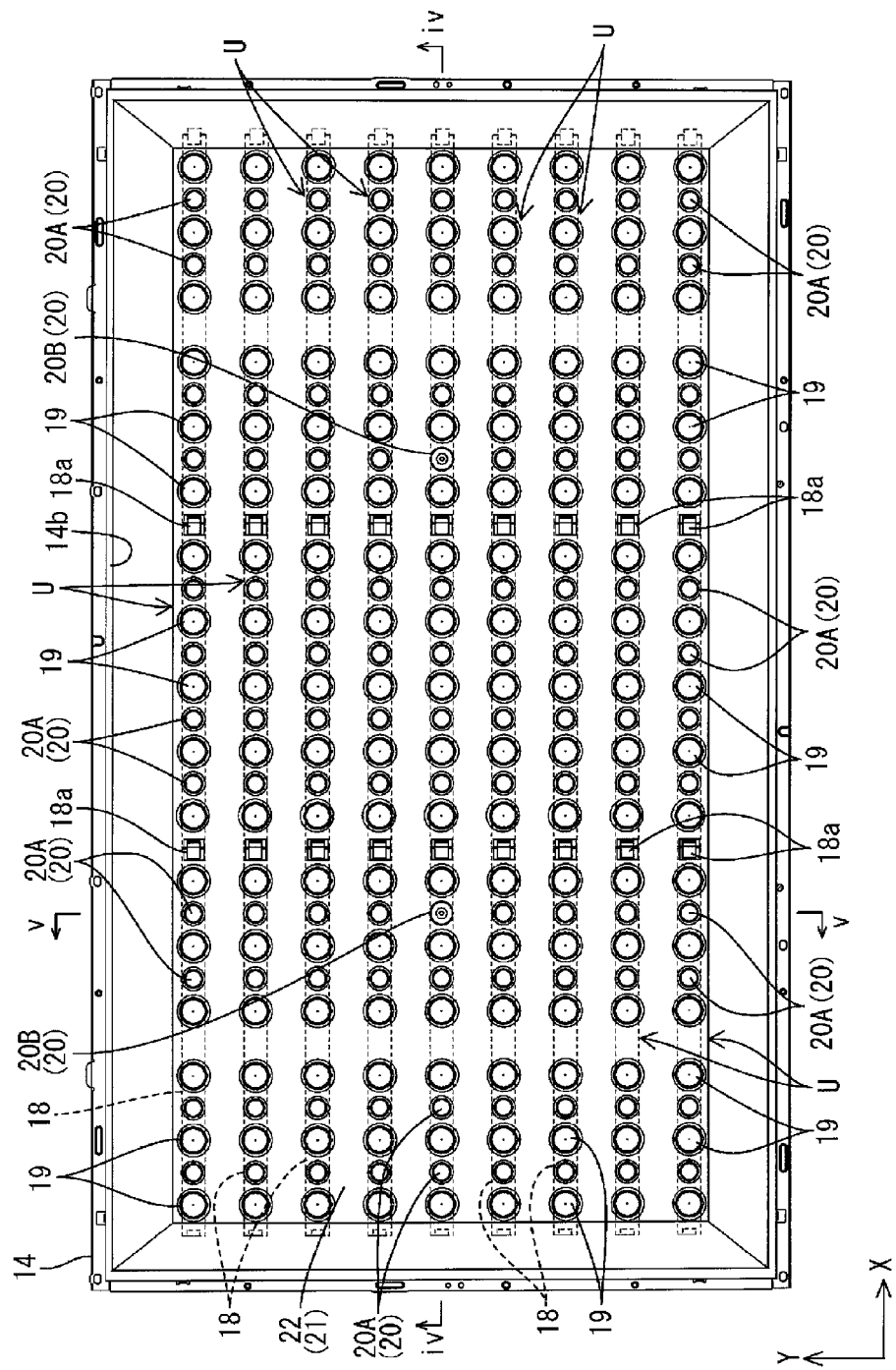
FIG. 3 is a plan view illustrating an arrangement configuration of LED boards and holding members in a chassis included in a liquid crystal display device.
Figure 4:
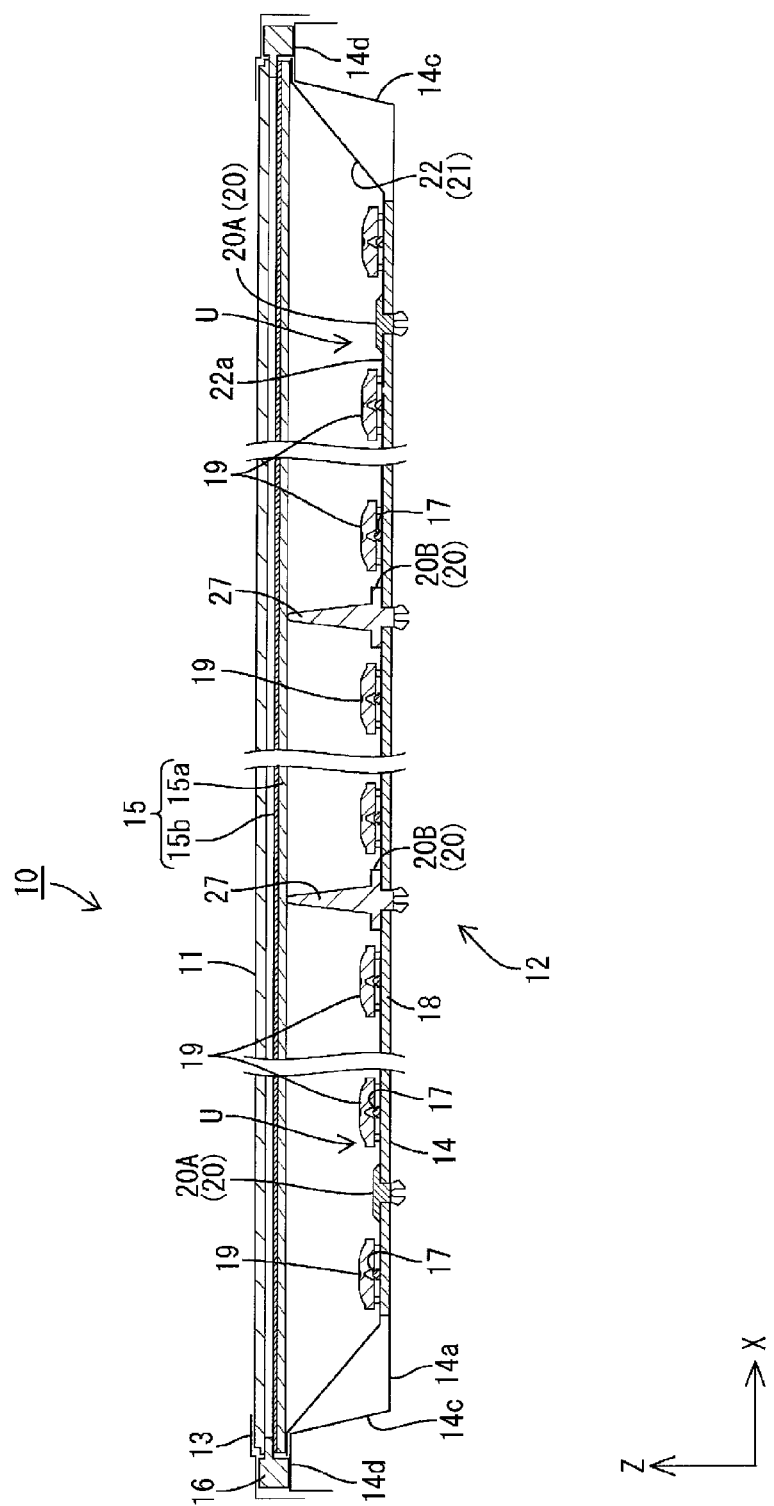
FIG. 4 is a cross-sectional view of the liquid crystal display device taken along a iv-iv line in FIG. 3.
Figure 5:
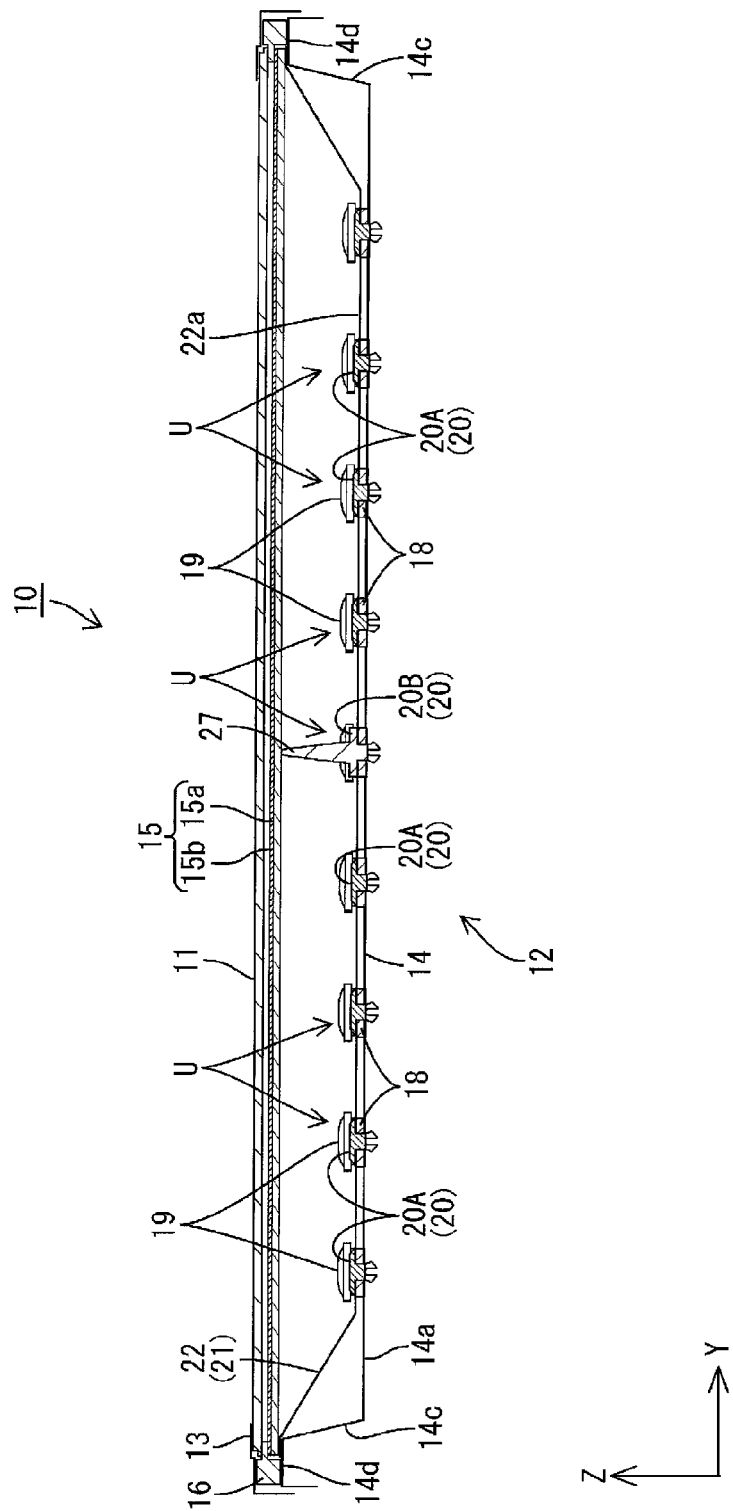
FIG. 5 is a cross-sectional view of the liquid crystal display device taken along a v-v line in FIG. 3.

The chassis 14 is made of metal. As illustrated in FIGS. 3 to 5, the chassis 14 includes a rectangular bottom plate 14a like the liquid crystal panel 11, side plates 14c each of which rises from an outer edge of the corresponding side of the bottom plate 14a, and a receiving plate 14d outwardly extending from a rising edge of each of the side plates 14c. An entire shape of the chassis 14 is a substantially shallow box shape (shallow plate shape) opened to the front surface side. A long side of the chassis 14 matches an X-axis direction (a horizontal direction) and a short side thereof matches a Y-axis direction (a vertical direction). The frame 16 and an optical member 15 that will be described later can be placed on the receiving plate 14c of the chassis 14 from the front-surface side. The frame 16 is fixed to each receiving plate 14c by screws. Mounting holes 14e that are through holes are formed in the bottom plate 14a of the chassis 14 to receive the holding members. A plurality of mounting holes 14e are formed with dispersed in the bottom plate 14a corresponding to the mounting positions of the holding members 20.

Figure 9:
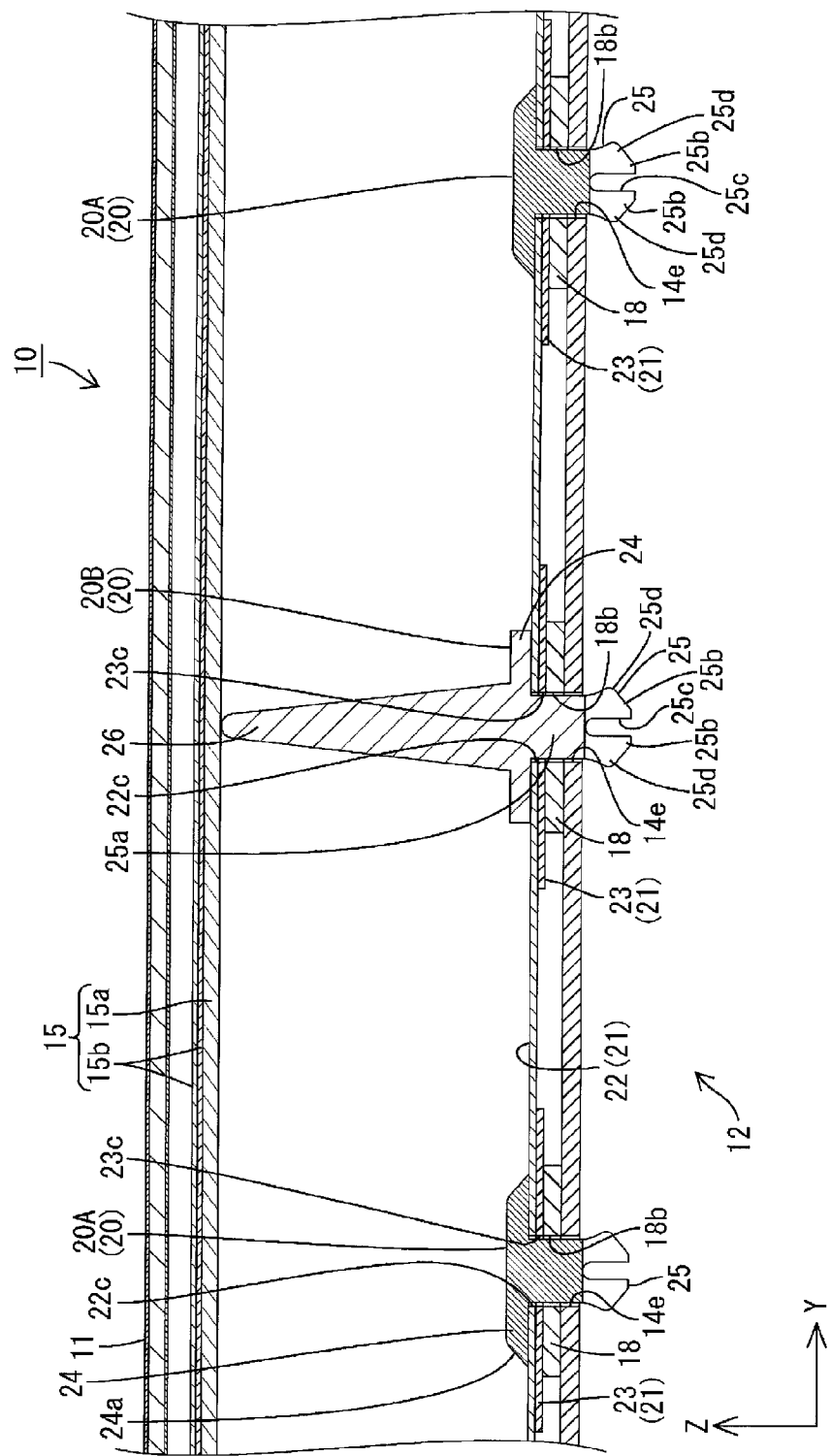
FIG. 9 is a cross-sectional view of the LED unit taken along a ix-ix line in FIG. 6.

As illustrated in FIG. 2, the optical member 15 is formed in a rectangular landscape with a plan view like the liquid crystal panel 11 and the chassis 14. As illustrated in FIGS. 4 and 5, the outer edge of the optical member 15 is placed on the receiving plate 14d so as to cover the opening 14b of the chassis 14 and provided between the liquid crystal panel 11 and the LED unit U. The optical member 15 includes a diffuser 15a and an optical sheet 15b. The diffuser 15a is provided on the rear-surface side (the LED unit U side, a side opposite from the light exit side) and the optical sheet 15b is provided on the front-surface side (the liquid crystal panel 11 side, the light exit side). The diffuser 15a includes a base member having a thickness and made of a substantially transparent synthetic resin and light scattering particles dispersed in the base member. The diffuser 15a has a function for diffusing light that transmitting therethrough. The optical sheet 15b is formed in a sheet having a thickness smaller than the diffuser 15a and includes laminated two layers (FIG. 9). A specific optical sheet 15b may include a diffuser sheet, a lens sheet, a reflecting type polarizing sheet, and any one of them may be selected to be used.

As illustrated in FIG. 2, the frame 16 is formed in a frame shape along an outer peripheral part of the liquid crystal panel 11 and the optical member 15. The frame 16 and each receiving plate 14d hold the outer peripheral part of the optical member 15 therebetween (FIGS. 4 and 5). The frame 16 receives a rear surface of the outer peripheral part of the liquid crystal panel 11 and the frame 16 and the bezel 13 that is provided on the front-surface side of the liquid crystal panel 11 hold the outer peripheral part of the liquid crystal panel 11 therebetween (FIGS. 4 and 5).

The reflection sheet 21 includes a chassis reflection sheet 22 (chassis reflection member) and a board reflection sheet 23 (reflection member). The reflection sheet 22 covers almost entire inner surface of the chassis 14. The board reflection sheet 23 covers independently each LED board 18. The board reflection sheet 23 is a component of the LED unit U which will be explained in detail later. The chassis reflection sheet 22 will be explained in detail.

Figure 6:
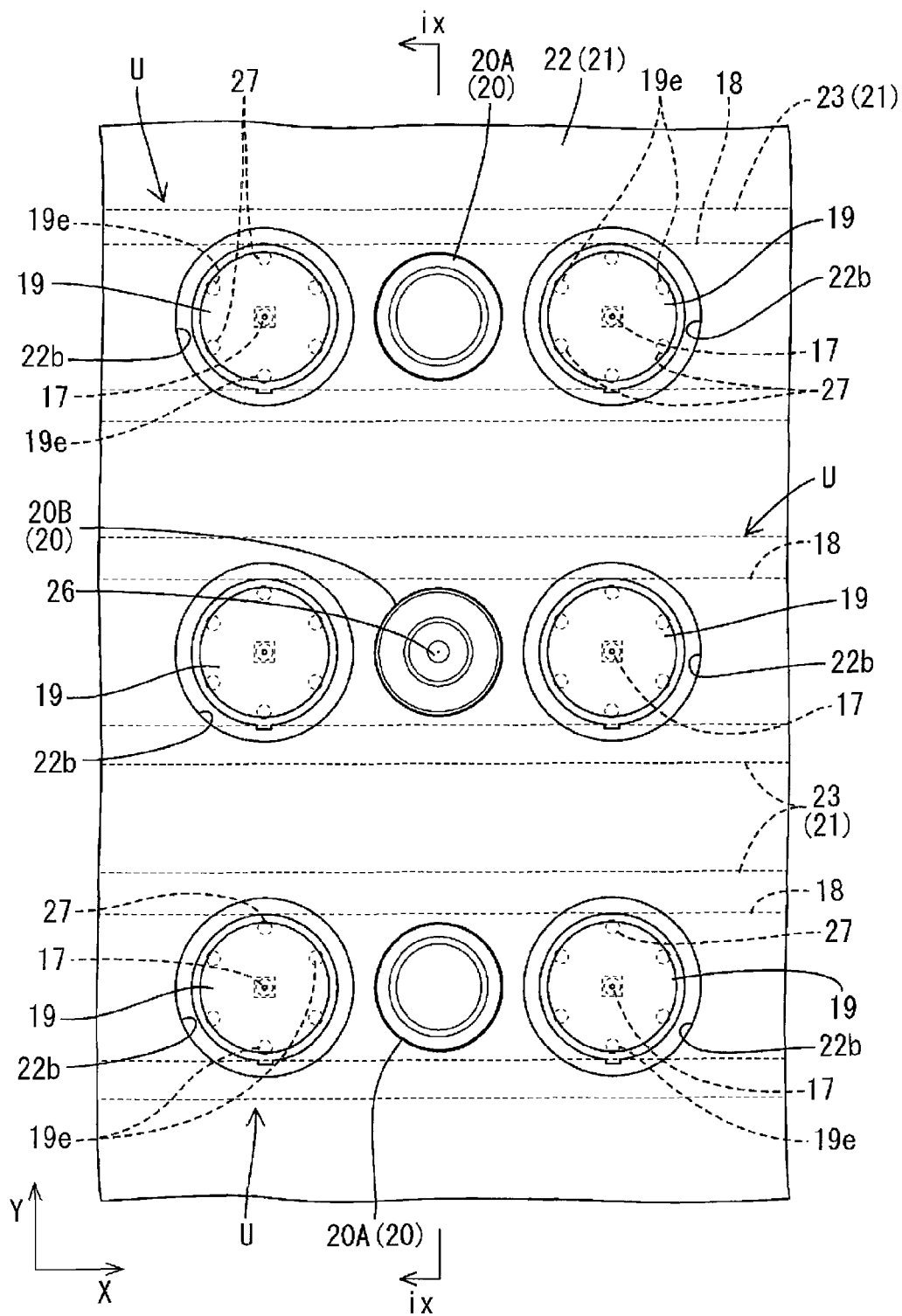
FIG. 6 is a plan view illustrating a detailed arrangement configuration of the LED boards and the holding members.

The chassis reflection sheet 22 is made of a synthetic resin, and has a surface having white color that provides excellent light reflectivity. As illustrated in FIG. 3, the chassis reflection sheet 22 extends along an inner surface of the chassis 14. Almost entire area of a middle portion extending along the bottom plate 14a of the chassis 14 is a main body 22a. Lens fitting holes 22b that are through holes are formed in the main body 22a such that a diffuser lens 19 is fitted therethrough. The diffuser lenses 19 are provided in the LED unit U in the chassis 14. The lens fitting holes 22b are formed in a matrix so as to correspond to the arrangement of the LED unit U and the diffuser lenses 19. As illustrated in FIG. 6, each lens fitting hole 22b is formed in a circular shape with a plan view and has a diameter greater than the diffuser lens 19. Accordingly, in arranging the chassis reflection sheet 22 in the chassis 14, each diffuser lens 19 can be fitted through each lens fitting hole 22b surely even if dimension errors occur. As illustrated in FIG. 3, the chassis reflection sheet 22 covers portions between adjacent diffuser lenses 19 and outer peripheral portions of the chassis 14. Therefore, the chassis reflection sheet 22 reflects light directing toward the portions toward the optical member 15 side. As illustrated in FIGS. 4 and 5, the outer peripheral portions of the chassis reflection sheet 22 are lifted up so as to cover the side plates 14c and the receiving plates 14d of the chassis 14 and the portions of the chassis reflection sheet 22 placed on the receiving plates 14d are sandwiched between the chassis 14 and the optical member 15. A portion of the chassis reflection sheet 22 connecting the main body 22a and each of the portions placed on the receiving plates 14d is slanted.

Next, the LED unit U will be explained in detail. The LED unit U includes the LEDs 17, an LED board 18 (a light source board) on which the LEDs 17 are mounted, the diffuser lenses 19 (an optical component) arranged on the LED board 18 corresponding to each LED 17, and the board reflection sheet 23 (a reflection member). Each component of the LED unit U will be explained in detail.

Figure 7:
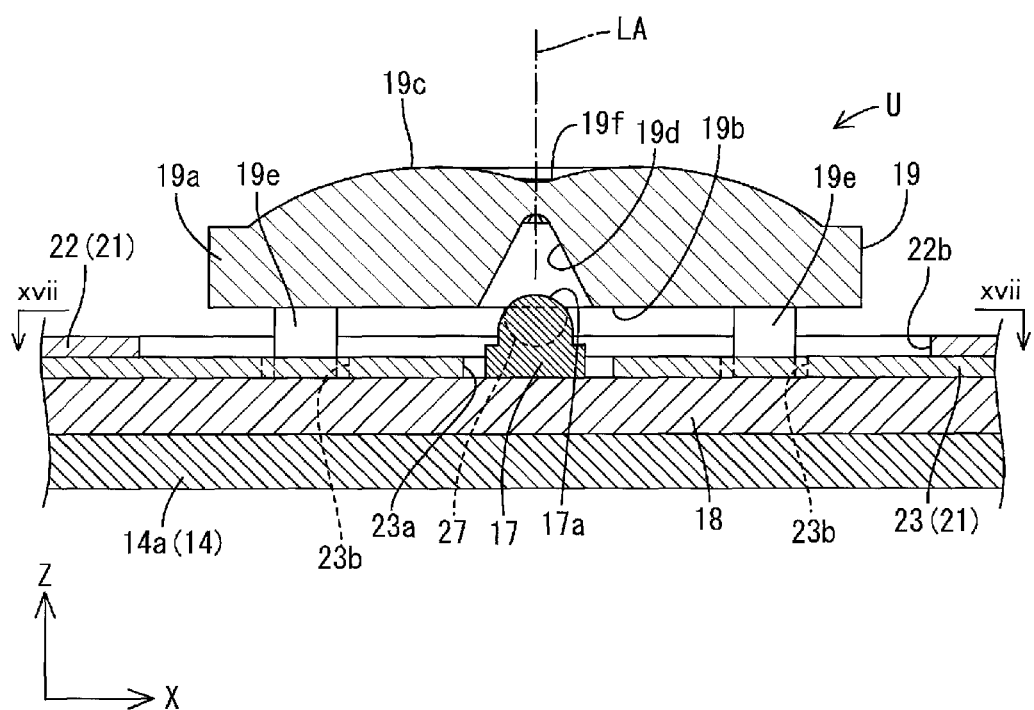
FIG. 7 is a cross-sectional view of an LED unit taken along the X-axis direction.
Figure 8:
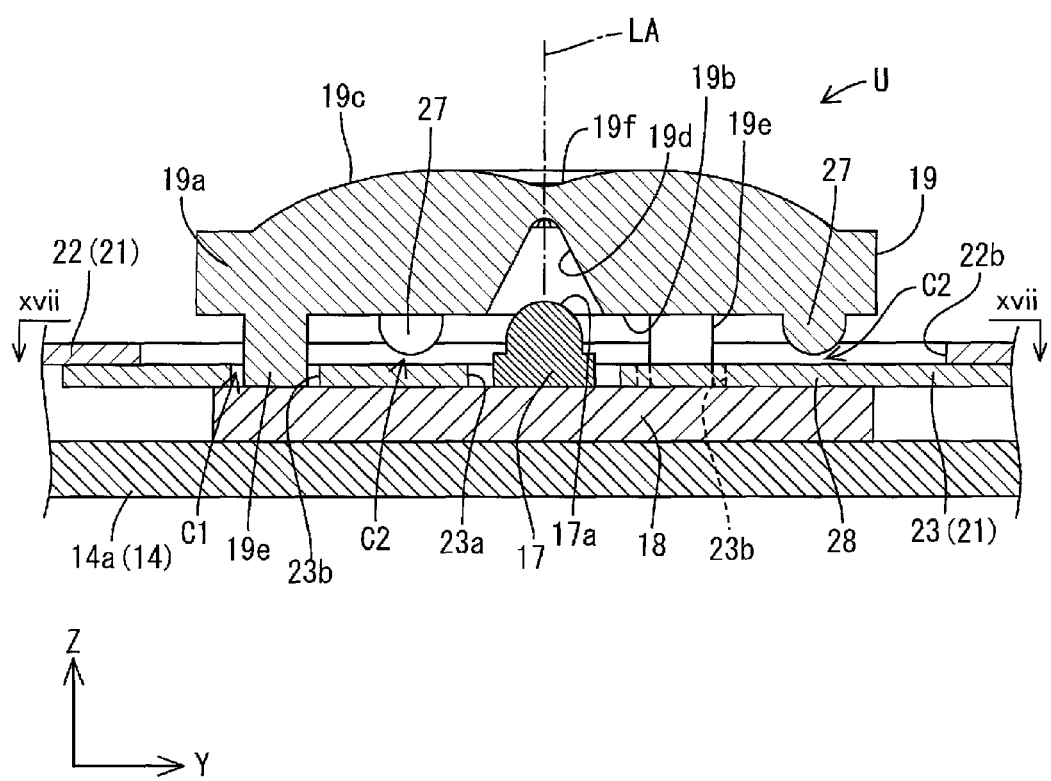
FIG. 8 is a cross-sectional view of the LED unit taken along the Y-axis direction.
Figure 10:
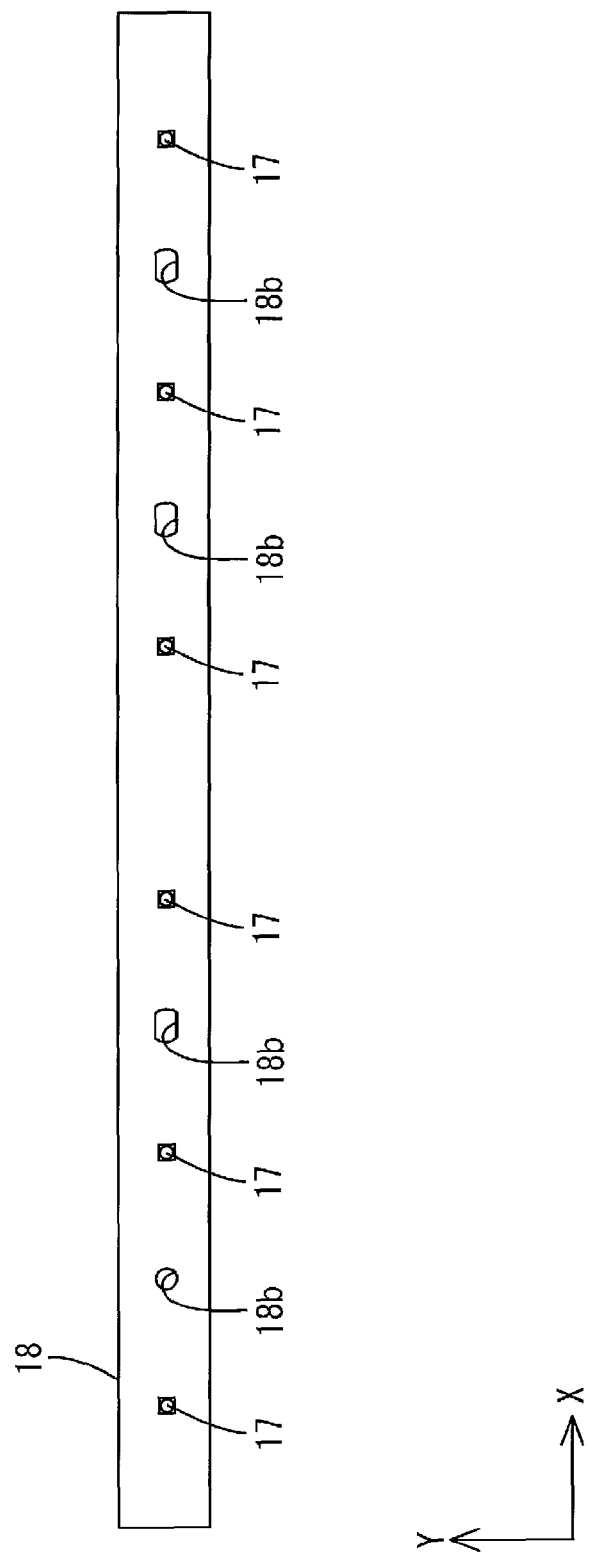
FIG. 10 is a plan view illustrating the LED board.

The LED 17 is a point light source (light source) formed in a point-like shape in a plan view. As illustrated in FIGS. 7, 8 and 10, the LED is configured by sealing a LED chip with a resin material onto a base board that is fixed to the LED board 18. The LED chip that is mounted on the base board has one main light emission wavelength and specifically, the LED chip that emits a single color of blue is used. On the other hand, a fluorescent material is dispersed in the resin material that seals the LED chip therein. The fluorescent material converts blue light emitted from the LED chip into white light. This enables the LED 17 to emit white light. The LED 17 is a top-type LED that has a light emitting surface 17a on a surface opposite from the mounting surface that is to be mounted to the LED board 18 (a surface that faces the front-surface side). A light axis LA of light emitted from the LED 17 substantially matches the Z-axis direction (a direction perpendicular to a main plate surface of the liquid crystal panel 11 and the optical member 15). Light emitted from the LED 17 radiates three-dimensionally around the light axis LA within a specified angle range and the directivity thereof is higher than that of cold cathode tubes. Namely, angle distributions of the LED 17 shows a tendency that the emission intensity of the LED 17 is significantly high along the light axis LA and sharply decreases as the angle to the light axis LA increases.

As illustrated in FIG. 10, the LED board 18 is formed in a base plate having a rectangular shape with a plan view, and the LED board 18 is housed in the chassis 14 with extending along the bottom plate 14a such that a long-side direction of the LED board matches the X-axis direction and a short-side direction thereof matches the Y-axis direction (FIG. 3). The base plate of the LED board 18 is made of metal such as aluminum material similar to the chassis 14 and a wiring pattern made of a metallic film such as copper foil is formed on a surface of the base plate via an insulating layer. An insulating material such as ceramics may be used for the base plate of the LED board 18. The above-structured LEDs 17 are mounted on a surface of the base plate of the LED board 18 that faces the front-surface side (that faces the optical member 15), as illustrated in FIGS. 7, 8 and 10. The LEDs 17 are arranged linearly along the long-side direction (the X-axis direction) of the LED board 18 and the LEDs 17 are connected in series to each other by the wiring pattern formed on the LED board 18. Arrangement intervals between the adjacent LEDs 17 are substantially constant, and the LEDs 17 are arranged at equal intervals. The LED board 18 is configured by LED arrangement portions in each of which the LEDs 17 are separately arranged and arrangement portions connecting portion that connect arrangement portions that connect adjacent LED arrangement portions. A connector portion 18a is provided at each end of the LED board 18 in the long-side direction and the connector portion 18a corresponds to a connector arrangement portion.

Figure 11:
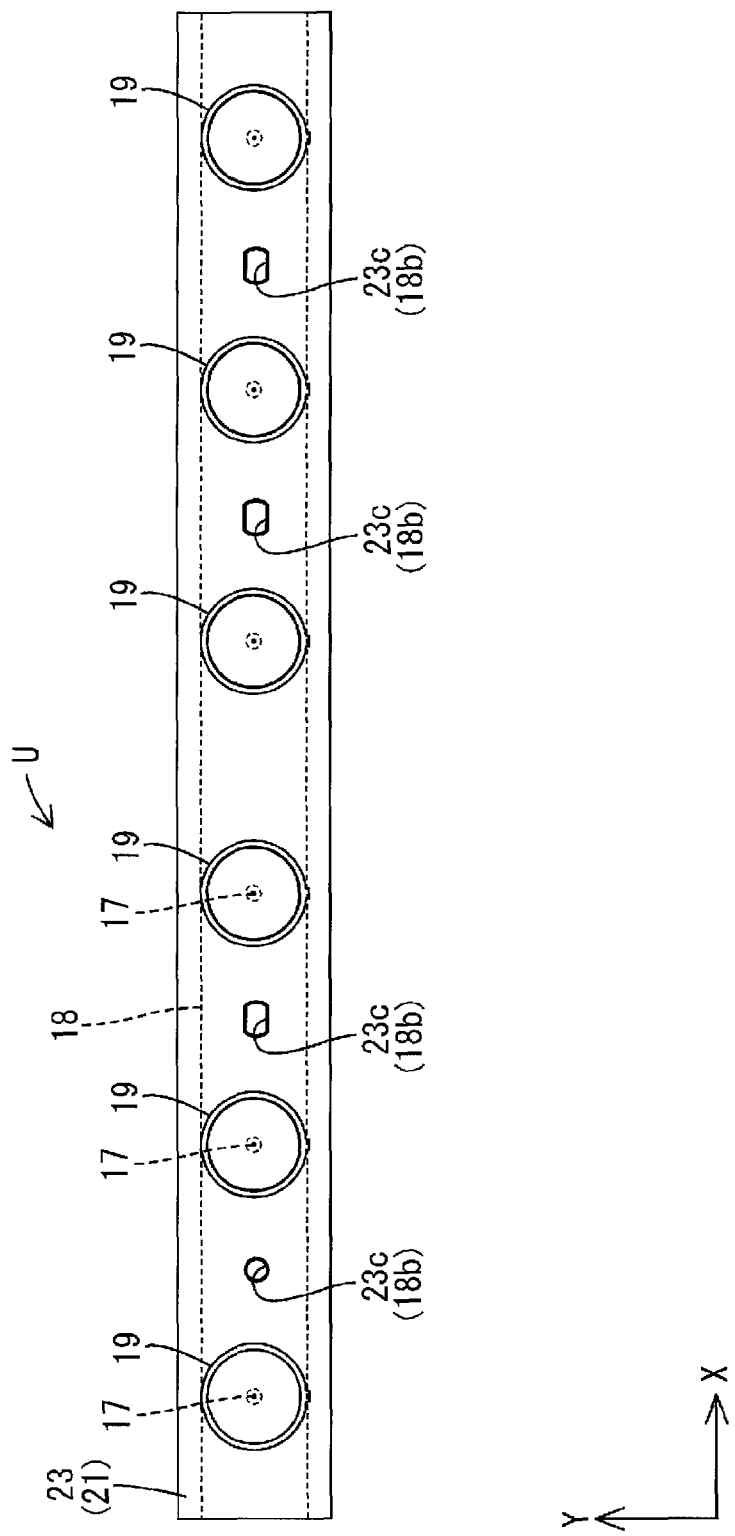
FIG. 11 is a plan view illustrating the LED unit.
Figure 12:
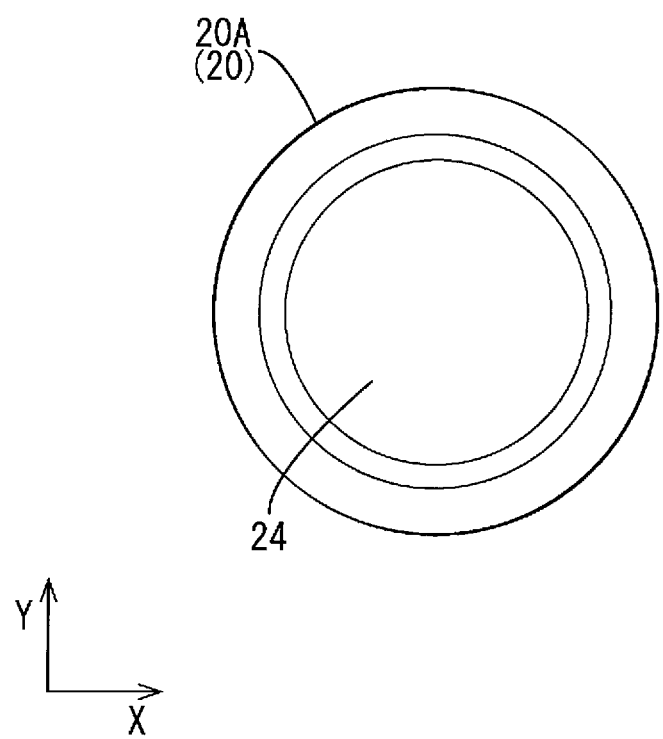
FIG. 12 is a plan view illustrating a single function-type holding member.

The diffuser lens 19 is made of a synthetic resin (such as polycarbonate or acrylic) that is substantially transparent (has high light transmission) and has refraction index higher than air. As illustrated in FIGS. 7, 8 and 11, the diffuser lens 19 has a specified thickness and has a lens body 19a formed in substantially a circular shape with plan view and the diffuser lens 19 is mounted to the LED board 18 so as to cover each LED 17 from the front-surface side individually and overlap each LED 17 in a plan view. The diffuser lens 19 faces a light emitting surface 17a of the LED 17 and diffuses light emitted from the light emitting surface 17a and having high directivity and exits the diffused light therefrom. The diffuser lens 19 is a kind of light diffusing component. Namely, light emitted from the LED 17 lowers its directivity by transmitting through the diffuser lens 19, and therefore, even if a distance between the adjacent LEDs 17 is large, the portion between the adjacent LEDs 17 is less likely to be recognized as dark portions. Accordingly, the number of LEDs 17 that are to be arranged can be decreased.

The diffuser lens 19 and the LED 17 are substantially concentrically arranged on the LED board 18 in a plan view. The diffuser lens 19 has a diameter sufficiently greater than the LED 17, and the diameter of the diffuser lens 19 is greater than the short-side dimension (Y-axis direction dimension) of the LED board 18 and smaller than the long-side dimension (X-axis direction dimension) of the LED board 18. Therefore, each end side of the diffuser lens 19 in the Y-axis direction extends outwardly by a certain dimension from the LED board 18 in the Y-axis direction. Namely, the diffuser lens 19 overlaps each end portion of the LED board 18 in the long-side direction (an outer edge located at each end in the Y-axis direction) in a plan view. The short-side dimension of the LED board 18 is smaller than the diameter of the diffuser lens 19. The LED board 18 is formed to have a minimum size so as to have the diffuser lens 19 thereon (specifically, that enables mounting of each mounting portion 19a). This reduces a material cost for the LED board 18.

The diffuser lens 19 includes a light entrance surface 19b and a light exit surface 19c. The light entrance surface 19b faces the rear-surface side and also faces the LED 17 and the LED board 18, and light from the LED 17 enters the light entrance surface 19b. The light exit surface 19c faces the front-surface side and also faces the optical member 15. As illustrated in FIGS. 7 and 8, the light entrance surface 19b is formed to be parallel to the plate surface of the LED board 18 as a whole (the X-axis direction and the Y-axis direction). A light entrance side recess 19d is formed in a portion (middle portion) that overlaps the LED 17 to form slanted surfaces. The light entrance side recess 19 has a substantially conical shape and the light entrance side recess 19 and the LED 17 are concentrically provided. The light entrance side recess 19 is open on the light entrance surface 19b that faces the rear-surface side and the LED 17. The light entrance side recess 19d has a diameter that is greatest at the opening end portion and greater than the diameter of the LED 17. The diameter of the light entrance recess 19d decreases in a continuous and gradual manner as is closer to the front-surface side and is smallest at the end on the front-surface side. The light entrance side recess 19d has a cross section of substantially a reversed V-shape and has a slanted peripheral surface that is slanted with respect to the Z-axis direction. The slanted surface is slanted such that an end portion of the light entrance side recess 19d crosses the light axis LA of light emitted from the LED 17. Therefore, light emitted from the LED 17 toward the light entrance side recess 19d enters the diffuser lens 19 from the slanted surface. The light emitted from the LED 17 enters the diffuser lens 19 with being refracted by the slanted surface at a slanted angle of the slanted surface with respect to the light axis LA, that is, a wide angle and directed to be away from a center.

Figure 17:
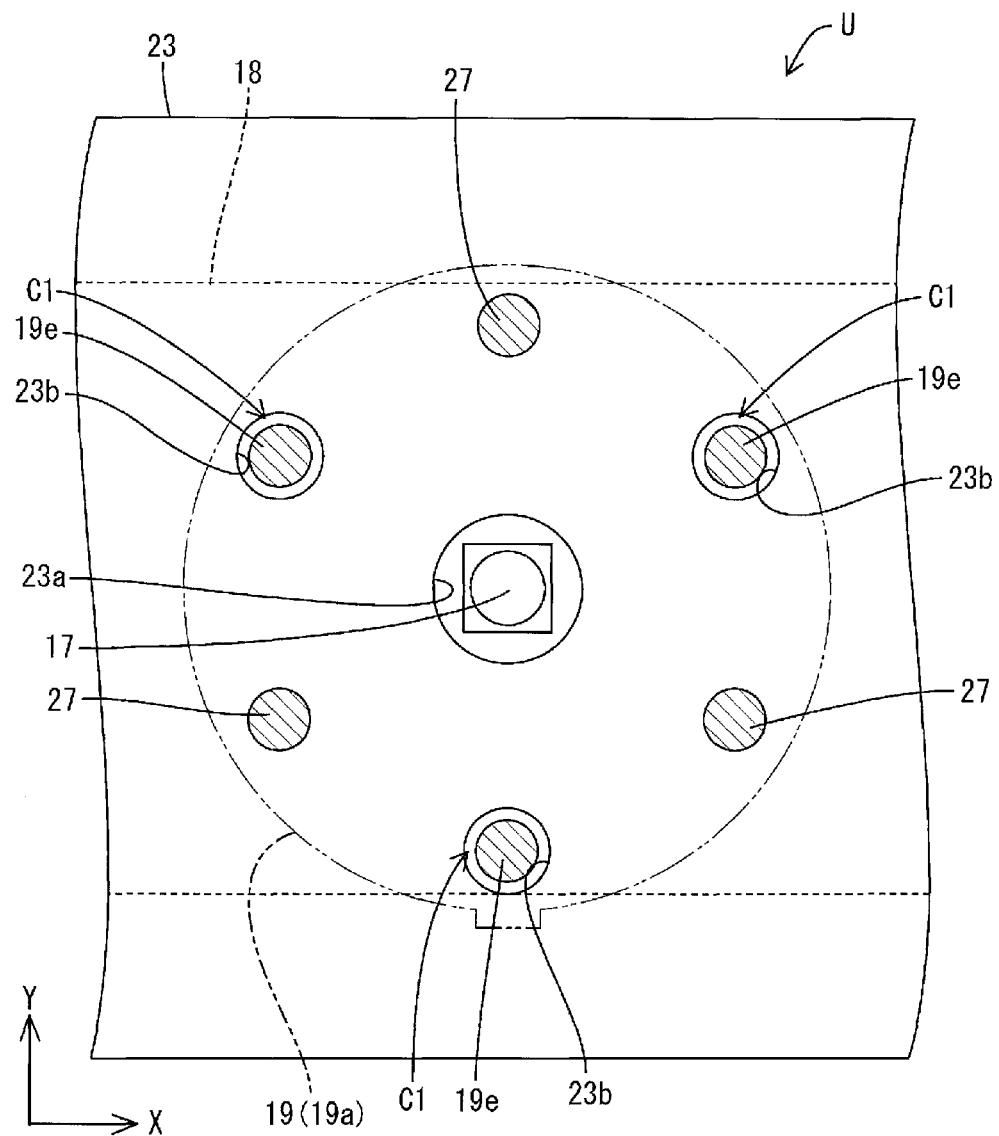
FIG. 17 is a cross-sectional view illustrating the LED unit taken along a xvii-xvii line in FIGS. 7 and 8.

Mounting portions 19e are provided on the light entrance surface 19b of the lens body 19a so as to be outwardly away from the light entrance side recess 19d in a radial direction, that is, away from the LED 17 with a plan view. As illustrated in FIGS. 7 and 8, the mounting portions 19e project toward the LED board 18 side so as to support the diffuser lens 19 to be mounted to the LED board 18. Each mounting portion 19e is formed in substantially a columnar shape (having a circular cross section) having substantially a constant diameter in an entire length. As illustrated in FIG. 17, each mounting portion 19e is formed in a point-like shape provided with dispersed in a surface area of the light entrance surface 19b. Specifically, three mounting portions 19e are provided on portions of the light entrance surface 19b each of which is closer to an outer peripheral edge of the light entrance surface 19b from the light entrance side recess 19d (the LED 17). The three mounting portions 19e are arranged such that lines connecting the three mounting portions 19e form substantially a right triangle in a plan view. Namely, the three mounting portions 19e are arranged to have angular intervals of 120 degrees and to have equal angular intervals on a surface area of the light entrance surface 19b of the lens body 19a. The mounting portions 19e are arranged at equal intervals to have an equal distance between adjacent mounting portions 19e and a distance between each mounting portion 19e and the LED 17 (a center of the diffuser lens 19) is equal. The mounting portion 19e that is located in a lower side in FIG. 17 is arranged to overlap a long-side outer edge of the LED board 18 in a plan view. The other two mounting portions 19e are arranged to be inner side of the long-side outer edge of the LED board 18. Namely, each of the mounting portions 19e that are arranged at equal angular intervals is arranged to have a maximum distance from the LED 17. A distal end of each mounting portion 19e is fixed to the LED board by an adhesive or the like. As illustrated in FIGS. 7 and 8, the lens body 19a is fixed to the LED board 18 via the mounting portions 19e so as to be supported to be away (lifted up) from the LED board 18 toward the front-surface side by the projection dimension of the mounting portions 19e. This ensures a gap (a clearance, a space) between the light entrance surface 19b and the LED board 18 (the board reflection sheet 23). Light from external space from the diffuser lens 19 in a plan view is allowed to enter the gap. In a state that the diffuser lens 19 is mounted to the LED board 18, the distal end portion of the LED 17 that is projected from the LED board 18 enters the light entrance side recess 19d.

The light exit surface 19c of the lens body 19a is formed in a flat spherical surface. Accordingly, the light exits from the diffuser lens 19 with being refracted at a wide angle at a border surface with an external air layer so as to be directed to be away from a center. A light exit side recess 19f is formed in a portion (a middle portion) of the light exit surface 19c that overlaps the LED 17 in a plan view. The light exit side recess 19f is formed in substantially a conical shape such that a peripheral surface is formed in a flat spherical surface declining toward a center. An angle formed between the light axis LA of light emitted from the LED 17 and a tangent line to the peripheral surface of the light exit side recess 19f is relatively greater than an angle formed between the light axis LA and the slanted surface of the light entrance side recess 19d. In a portion of the light exit surface 19c that overlaps the LED 17 in a plan view, the amount of light from the LED 17 is extremely great and brightness is locally high. The light exit side recess 19f is formed on the portion of the light exit surface 19c and most of the rays of light emitted from the LED 17 is refracted at a wide angle to be exited therefrom or a part of the rays of light emitted from the LED 17 is reflected to the LED board 18 side. Accordingly, it is suppressed that brightness of the portion of the light exit surface 19c that overlaps the LED 17 is locally high and unevenness of brightness is less likely to occur.

The board reflection sheet 23 is made of a synthetic resin and has a surface having white color that provides excellent light reflectivity. As illustrated in FIG. 11, the board reflection sheet 23 extends along the LED board 18 and has a substantially same outer shape as the LED board 18 to be formed in a rectangular shape in a plan view. As illustrated in FIGS. 7 and 8, the board reflection sheet 23 is arranged to cover the front side surface of the LED board 18 that is the mounting surface where the LEDs 17 are mounted so as to cover almost its entire surface. As illustrated in FIGS. 7 and 8, the board reflection sheet 23 is provided between the diffuser lens 19 and the LED board 18 and faces the light entrance surface 19b (a surface on the LED 17 side) of the diffuser lens 19. Therefore, the board reflection sheet 23 is provided in a space of the lens fitting hole 22b formed in the chassis reflection sheet 22 that is overlapped with the board reflection sheet 23 on its front-surface side in a plan view. Accordingly, light entering the lens fitting hole 22b is reflected by the board reflection sheet 23 to the diffuser lens 19. A gap is ensured between the board reflection sheet 23 and the light entrance surface 19b of the diffuser lens 19 that is lifted up by the mounting portions 19e. Light emitted from the LED 17 and directed to the diffuser lens 19 (the light entrance surface 19b), light reflected by the diffuser lens 19 and returned to the LED board 18 side, and light reflected by the board reflection sheet 23 and directed again to the diffuser lens 19 side cross in a space of the gap. The amount of such light tends to increase as is closer to the LED 17 (the light source) in a plan view and decrease as is far away from the LED 17.

As illustrated in FIG. 11, the board light reflection sheet 23 has a long-side dimension substantially same as the LED board 18 and has a short-side dimension greater than the LED board 18. Namely, the board reflection sheet 23 is greater than the LED board 18 in the Y-axis direction with a plan view and each long-side edge of the board reflection sheet 23 projects outwardly in the Y-axis direction from each long-side edge of the LED board 18 (each of the long side edges of the LED board 18 that are provided on opposite sides). Specifically, the short-side dimension of the board reflection sheet 23 is greater than a diameter of the diffuser lens 19 and a diameter of the lens fitting hole 22b of the chassis reflection sheet 22, as illustrated in FIGS. 6 and 8. Namely, the board reflection sheet 23 is provided on substantially an entire area of a portion of the LED board 18 that faces the diffuser lens and the board reflection sheet 23 is provided on substantially an entire area of a portion of the LED board 18 that is located in the lens fitting hole 22b with a plan view (including a portion of the LED board 18 between the diffuser lens 19 and the lens fitting hole 22b) and the board reflection sheet 23 is provided to overlap the edge portion of the lens fitting hole 22b. Therefore, most of the light reflected by the diffuser lens 19 and returned to the LED board 18 side and the light directed into the lens fitting hole 22b from external space of the diffuser lens 19 in a plan view is directed to the diffuser lens 19 by the board reflection sheet 23 without any leaking. This improves light use efficiency and improves brightness. In other words, sufficient brightness is obtained with decreasing the number of LEDs 17 and lowering a cost. The edge portion of the lens fitting hole 22b of the chassis reflection sheet 22 overlaps the board reflection sheet 23 on the front-surface side. Therefore, the chassis reflection sheet 22 and the board reflection sheet 23 are continuously arranged on a plane surface without any disconnection within the chassis 14, and the chassis 14 or the LED board 18 is not exposed to the front-surface side from the lens fitting hole 22b. Therefore, the light in the chassis 14 is reflected to the optical member 15 effectively and brightness is improved effectively.

Figure 16:
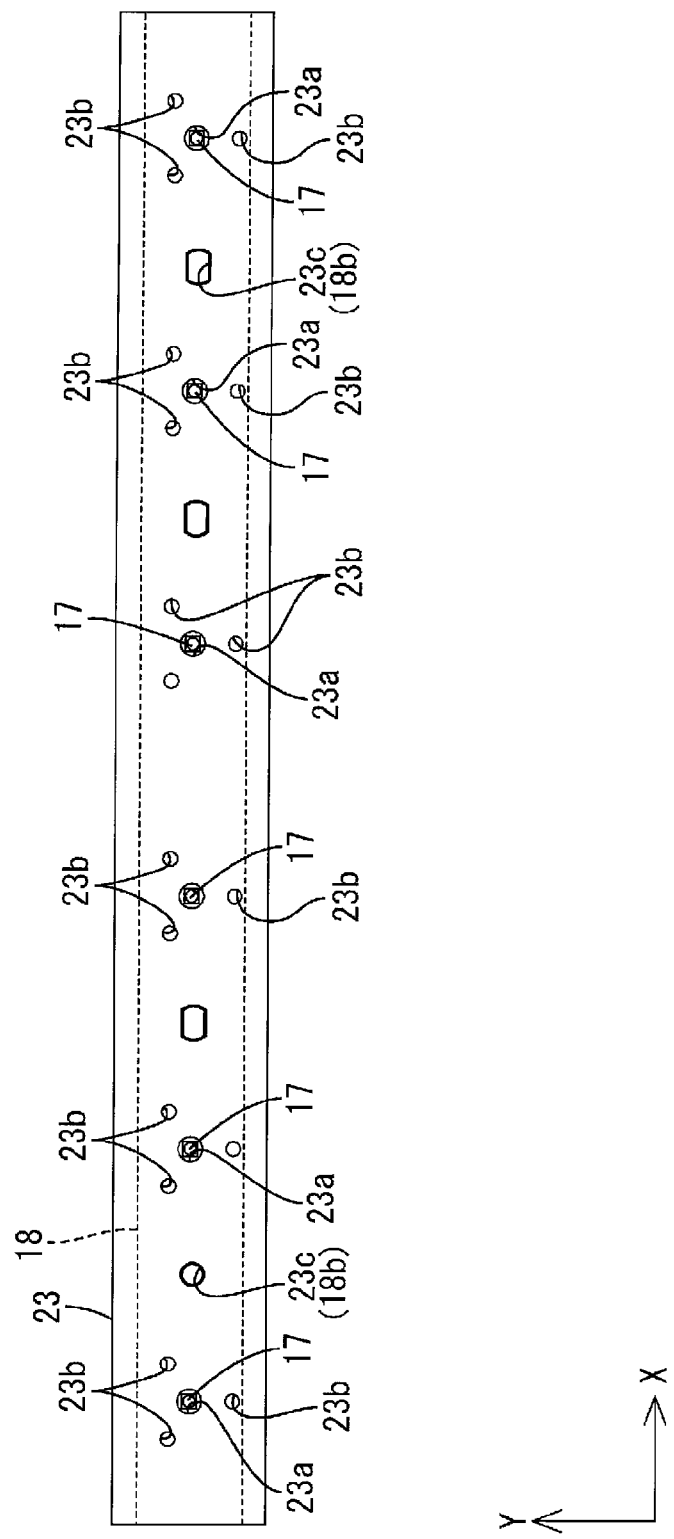
FIG. 16 is a plan view illustrating the LED board on which a board reflecting sheet is provided before providing diffuser lenses.

As illustrated in FIG. 16, an LED fitting hole 23a is formed in a portion of the board reflection sheet 23 that overlaps each LED 17 on the LED board 18 in a plan view. Each LED 17 is fitted in the LED fitting hole 23a. The LED fitting holes 23a are arranged on the board reflection sheet 23 at arrangement intervals as same as the LEDs 17. A diameter of each LED fitting hole 23a is greater than that of the LED 17 and smaller than that of the lens fitting hole 22b of the chassis reflection sheet 22 and the diffuser lens 19. Mounting portion fitting holes 23b are formed in the board reflection sheet 23 corresponding to the mounting portions 19e. The mounting portion fitting holes 23b are through holes and the mounting portion 19e is fitted through each mounting portion fitting hole 23b. Each mounting portion fitting hole 23b is formed in substantially a circular shape with a plan view so as to fit to an outer shape of the mounting portion 19e. A diameter of each mounting portion fitting hole 23b is slightly greater than that of the mounting portion 19e. Therefore, a gap C1 is ensured between a periphery of the mounting portion fitting hole 23b and a periphery of the mounting portion 19e (FIGS. 7, 8 and 17). A set of three mounting portion fitting holes 23b are formed in the board reflection sheet 23 to surround each LED fitting hole 23a. Each of the three mounting portion fitting holes 23b is formed to have equal distance from the LED fitting hole 23a in the middle portion and the three mounting portion fitting holes 23a are formed at equal angular intervals of approximately 120 degrees. The arrangement of the mounting portion fitting holes 23b is similar to that of the mounting portions 19e of the diffuser lens 19, and is not explained in detail. The board reflection sheet 23 is configured by a plurality of LED surrounding reflecting portions (diffuser lens surrounding reflecting portions) that surround each of the LEDs 17 and a plurality of connecting portions each of which connects adjacent LED surrounding reflecting portions.

As illustrated in FIG. 3, a plurality of LED units U including the above components are arranged to be parallel to each other in the X-axis direction and in the Y-axis direction within the chassis 14 such that they are justified in the long-side direction and in the short-side direction. Namely, the LED units U (the LED boards 18 and the LEDs 17 mounted thereon) are arranged in rows and columns (in a matrix) within the chassis 14. The X-axis direction (the long-side direction of the chassis 14 and the LED board 18) corresponds to the row direction and the Y-axis direction (the short-side direction of the chassis 14 and the LED board 18) corresponds to the column direction. Specifically, three LED units U are arranged parallel to each other in the X-axis direction within the chassis 14 and nine LED units are arranged parallel to each other in the Y-axis direction and total of twenty seven LED units U are arranged parallel to each other in the chassis 14. In the present embodiment, two kinds of LED boards 18 having a different long-side dimension and the different number of LEDs 17 mounted thereon are used for the LED unit U. Specifically, the LED board 18 includes a six LEDs mounted-type and a five LEDs mounted-type. The six LEDs mounted-type LED board 18 has six LEDs mounted thereon and has a relatively great long-side dimension. The five LEDs mounted-type LED board 18 has five LEDs mounted thereon and has a relatively small long-side dimension. The six LEDs mounted-type LED board 18 is arranged on each end portion of the chassis 14 in the X-axis direction and the five LEDs mounted-type LED board 18 is arranged in a middle portion of the chassis 14 in the X-axis direction. The LED boards 18 that are arranged in the X-axis direction to form a row are electrically connected to each other by connecting the adjacent connector portions 18a by fitting. The connector portions 18a located at the ends of the chassis 14 in the X-axis direction are electrically connected to an external control circuit (not illustrated). Accordingly, the LEDs 17 arranged on each of the LED boards 18 that are arranged to form a row are connected in series and turning on and off of the LEDs 17 included in one row of the LED boards 18 can be controlled collectively by one control circuit. This achieves a low cost. The LED boards 18 having a different long-side dimension and the different number of LEDs 17 mounted thereon have a same short-side dimension and same arrangement intervals of the LEDs 17.

Thus, a plurality kinds of the LED boards 18 having different long-side dimensions and different number of LEDs 17 mounted thereon are prepared to be used by combining the different kinds of LED boards 18 appropriately. Accordingly, following advantageous effects can be obtained. In case of manufacturing a plurality types of liquid crystal display devices 10 having different screen sizes, it is effective to determine whether each kind of LED boards 18 is used or not and change the number of LED board 18 for each kind according to each screen size. Compared to a case in which the LED boards having a long-side dimension same as the chassis 14 that is designed exclusively for each screen size are prepared for every screen size, the kind of the LED boards 18 that is necessary for manufacturing a plurality types of liquid crystal display devices 10 having different screen sizes is decreased and this lowers a manufacturing cost. In addition to the two kinds of LED boards 18 (the five LEDs mounted-type LED board 18 and the six LEDs mounted-type LED board 18), an eight LEDs mounted-type LED board 18 having eight LEDs 17 are mounted thereon may be used. The three kinds of LED boards 18 may be combined appropriately to be used for easily manufacturing liquid crystal display devices 10 having different screen sizes of 26 inches, 32 inches, 37 inches, 40 inches, 42 inches, 46 inches, 52 inches, and 65 inches with a low cost.

Next, the holding members 20 that hold the LED unit U in a mounted state will be explained. The holding member 20 includes a multifunction-type holding member 20B and a single function-type holding member 20A. The multifunction-type holding member 20B has a holding function for holding the LED boards 18 and a supporting function for supporting the optical member 15. The single function-type holding member 20A does not have the supporting member but has the holding member. In the following description, the single function-type holding member 20A is distinguished from the multifunction-type holding member 20B by adding "A" to the symbols representing the components related to the single function-type holding member 20A and adding "B" to the symbols representing the components related to the multifunction-type holding member 20B. Nothing is added to the symbols if not necessary to distinguish one from the another.

An arrangement of the holding members 20 in the chassis 14 will be explained. As illustrated in FIG. 3, a plurality of holding members 20 are arranged parallel to each other in a surface area of the bottom plate 14a of the chassis 14. Specifically, the holding members 20 are arranged on the bottom plate 14a in rows and columns (in a matrix). The X-axis direction (the long-side direction of the chassis 14 and the LED board 18) corresponds to the row direction and the Y-axis direction (the short-side direction of the chassis 14 and the LED board 18) corresponds to the column direction. Each holding member 20 is arranged between the adjacent diffuser lenses 19 (the LEDs 17) so as to overlap the LED board 18 in a plan view. Therefore, the holding members 20 are arranged in a similar manner as the diffuser lenses 19 and the LEDs 17. Each holding member 20 is arranged between the adjacent diffuser lenses 19 (the LEDs 17) on the LED board 18. Therefore, the diffuser lens (the LED 17) and the holding member 20 are alternately arranged in the X-axis direction. Specifically, four holding members 20 are arranged on each LED board 18.

Among the holding members 20 that are arranged in the chassis 14, two holding members 20 are multifunction-type holding members 20B and the other holding members 20 are single function-type holding members 20A, as illustrated in FIG. 3. Each of the two multifunction-type holding members 20B is arranged in a middle portion in the short-side direction of the chassis 14 and closer to the middle portion in the long-side direction from the outer end. The multifunction-type holding members 20B are arranged so as to sandwich the middle one of the three LED boards 18 that are arranged in the X-axis direction and to be arranged symmetrically on either side of the middle LED board 18.

A specific construction of the holding member 20 will be explained. The two kinds of holding members 20 have a mostly common construction and the common construction will be explained first. The holding member 20 is made of a synthetic resin such as polycarbonate and has a surface having white color that provides excellent light reflectivity. The holding member 20 is formed in substantially a circular shape as a whole with plan view. As illustrated in FIG. 9, the holding member 20 includes a main body 24 and a fixing portion 25. The main body 24 is formed along the bottom plate 14a of the chassis 14 and the plate surface of the LED board 18. The fixing portion 25 projects from the main body 24 toward the rear-surface side or toward the chassis 14 side to be fixed to the chassis 14. Each holding member 20 is formed to be almost symmetrically with respect to a center axis that corresponds to the Z-axis direction.

As illustrated in FIGS. 12 to 15, the main body 24 is formed in substantially a circular shape in a plan view and is formed in substantially a flat plate along the X-axis direction and the Y-axis direction. As illustrated in FIG. 6, the main body 24 has a diameter substantially equal to the short-side dimension (the Y-axis dimension) of the LED board 18. The main body 24 is mounted to a position overlapping the LED board 18 in a plan view so as to hold the LED board 18 with the bottom plate 14a of the chassis 14 therebetween. The main body 24 is mounted to hold the LED board 18 to the chassis 14 after the reflection sheets 22, 23 are provided on the front-surface side of the LED board 18. Therefore, the reflection sheets 22, 23 are held collectively with the LED board 18 between the main body 24 and the bottom plate 14a (FIG. 9). The diameter of the main body 24 is smaller than a distance (an arrangement interval) between the adjacent diffuser lenses 19 (the LEDs 17) in the X-axis direction. Accordingly, the main body 24 is provided in a portion of the LED board 18 between the adjacent diffuser lenses 19 (the LEDs 17) in the X-axis direction, that is, in a non-luminous portion of the LED board 18. Therefore, the main body 24 does not overlap the LED 17 in a plan view. The main body 24 does not interrupt the light emitted from the LED 17. In the present embodiment, a sufficient distance is ensured between the LEDs 17 due to mounting of the diffuser lenses 19. Each holding member 20 is provided in the space generated by the distance between the LEDs 17 and the holding member 20 fixes the LED board 18.

Figure 13:
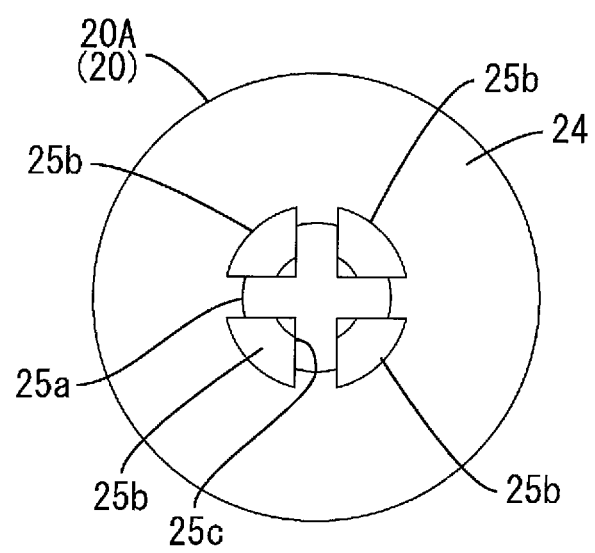
FIG. 13 is a bottom view illustrating the single function-type holding member.
Figure 15:
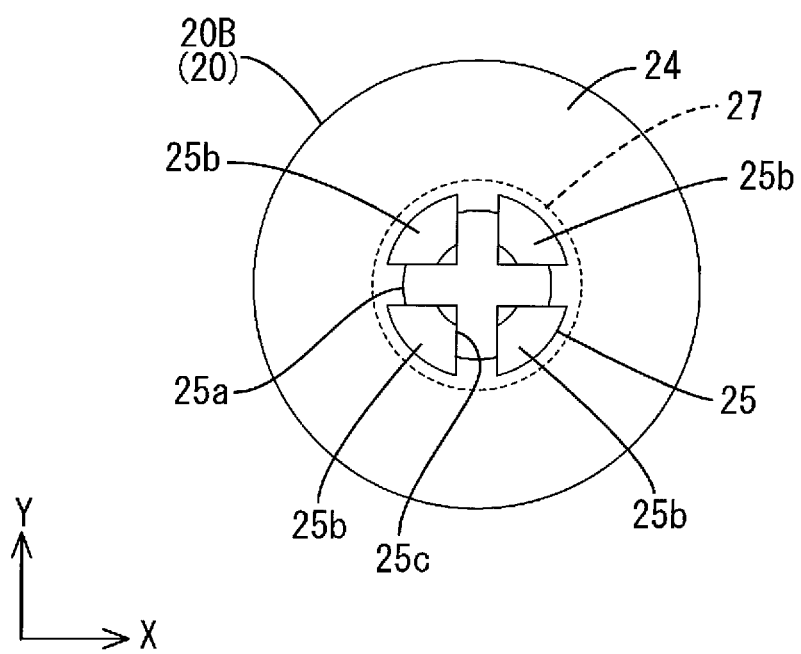
FIG. 15 is a bottom view illustrating the multifunction-type holding member.

As illustrated in FIG. 9, the fixing portion 25 is fitted through the mounting hole 14c that is formed in the bottom plate 14a of the chassis 14 corresponding to the mounting position of the holding member 20 and is stopped by the bottom plate 14a. In the following, a detailed construction of the fixing portion 25 will be explained. As illustrated in FIGS. 13 and 15, the fixing portion 25 is provided in the middle portion of the main body 24. The fixing portion 25 and the main body 24 are concentrically provided. As illustrated in FIG. 9, the fixing portion 25 projects from the rear-side surface of the main body 24 (a surface facing the chassis 14) toward the rear-surface side and has a recess 25c at the distal end portion to have elastic stoppers 25b. In other words, the fixing portion 25 includes a base portion 25a and the elastic stoppers 25b. The base portion 24a projects from the main body 24 toward the rear-surface side and the elastic stoppers 25b further projects from the projected distal end of the base portion 25a toward the rear-surface side. The base portion 25a is formed in substantially a columnar shape and has a diameter smaller than the mounting hole 14e formed in the chassis 14 so as to allow insertion through the mounting hole 14e.

As illustrated in FIGS. 13 and 15, four elastic stoppers 25b are formed by forming the recess 25c in substantially a cross shape in a plan view. As illustrated in FIG. 9, each elastic stopper 25b is formed in a cantilever so as to be contracted within the recess 25c by its projection basal end portion projected from the base portion 25a as a support point and elastically deformed. Namely, the recess 25c forms a space that allows each elastic stopper 25b to be deformed. Each elastic stopper 25b has a stopper portion 25d on its outer surface. The stopper portion 25d projects outwardly that is in a direction opposite from the recess 25c. The stopper portion 25d projects outwardly further from an outer peripheral surface of the base portion 25a. The fixing portion 25 has a diameter at its projected end (a maximum diameter) is greater than the mounting hole 14e. In other words, the projected end of the stopper portion 25d is located on an outer side from the inner peripheral surface of the mounting hole 14e. Therefore, the stopper portion 25d is stopped by the edge portion of the mounting hole 14e of the chassis 14, that is, a portion of the chassis 14 in adjacent to the fixing portion 25 from the rear-surface side. Therefore, if the fixing portion 25 is inserted through the mounting hole 14e of the chassis 14, each elastic stopper 25b is inserted through the mounting hole 14e and elastically stopped by the edge portion of the mounting hole 14e from the rear-surface side. Accordingly, the holding member 20 is fixed to the chassis 14 in the mounted state. The mounting holes 14e are formed in the bottom plate 14a of the chassis 14 corresponding to the mounting positions of the holding members 20 so as to be in a matrix along the X-axis direction and the Y-axis direction.

As illustrated in FIG. 6, an entire area of the main body 24 having the fixing portion 25 overlaps the LED board 18 in a plan view, and therefore the fixing portion 25 also overlap the LED board 18 in a plan view. Through holes 18b are formed in the LED board 18 such that the fixing portions 25 are fitted therethrough. As illustrated in FIG. 10, the through holes 18b are formed in the LED board 18 between the adjacent LEDs 17 (the diffuser lenses 19) so as not to overlap the LEDs 17 (the diffuser lenses 19) in a plan view. Each of the through holes 18b is formed in a thin elongated shape along the X-axis direction in a plan view and has an arc shaped end portion at each short-side end. Each through hole 18b has a short-side dimension that just allows the fixing portion 25 to be inserted therethrough and has a long-side dimension that allows the fixing portion 25 to be inserted therethrough with some allowance. As illustrated in FIG. 9, each through hole 18b is formed through the LED board 18 in the Z-axis direction such that the fixing portion 25 is fitted through the LED board 18. Therefore, the LED board 18 is positioned in the X-axis direction and the Y-axis direction by the fixing portion 25 fitted through the through hole 18b. As illustrated in FIGS. 9 and 11, on each reflection sheet 22, 23 held between the main body 24 and the LED board 18, in portions overlapping the through holes 18b in a plan view, communication holes 22c, 23c are formed so as to be communicated with the through hole 18b and such that the fixing portion 25 is fitted therethrough.

Next, a different construction between the two kinds of holding members 20 will be explained. As illustrated in FIG. 9, slanted surfaces 24a are formed on an outer peripheral end surface of the main body 24 of the single function-type holding member 20A. Each slanted surface 24a declines from the middle portion toward the outer end side of the main body 24. This cancels or reduces a step that can be generated between the main body 24 and the chassis reflection sheet 22. Accordingly, the outer peripheral edge portion of the main body 24 (a border portion between the main body 24 and the reflection sheet 21) is less likely to be recognized as brightness unevenness via the optical member 15. As is not illustrated, the slanted surfaces 24a may be formed in the multifunction-type holding member 20B.

As illustrated in FIG. 9, the multifunction-type holding member 20B includes a support portion 26 that projects from the main body 24 toward the front-surface side to support the optical member 15 from the rear-surface side. The support portion 26 is formed in a conical shape as a whole. The support portion 26 has a circular cross section taken along the plate surface of the main body 24 and is formed in a tapered shape such that its diameter decreases from the projection basal end toward the projection distal end. The support portion 26 comes in contact with the diffuser 15a that is provided on the rear-surface side to be closest to the LED 17 and accordingly the diffuser 15a is supported in a specified position. The support portion 26 determines the position relationship between the optical member 15 and the LED 17 in the Z-axis direction (in a direction perpendicular to a surface of the optical member 15) in a constant state.

The projection basal portion of the support portion 26 has an outer diameter that is smaller than the short-side dimension of the main body 24 and the short-side dimension of the LED board 18. Namely, the support portion 26 is formed in a point-like shape in a plan view and the support portion 24 is formed in a plate shape that extends in a range wider than the support portion 26 in a plan view. A projection dimension of the support portion 26 is substantially equal to a distance from a front surface of the main body 24 to a rear surface of the diffuser 15a that is in a flat state along the X-axis direction and the Y-axis direction. Therefore, the support portion 26 comes in contact with the diffuser 15a that is in substantially a flat state. The projection distal end portion of the support portion 26 that comes in contact with the diffuser 15a is formed to be round. The support portion 26 is only the part of the multifunction-type holding member 20B that projects from the main body 24 toward the front-surface side. In mounting the multifunction-type holding member 20B to the chassis 14, an operator uses the support portion 26 as an operating portion. This improves an operation property of detaching and mounting the multifunction-type holding member 20.

Figure 14:
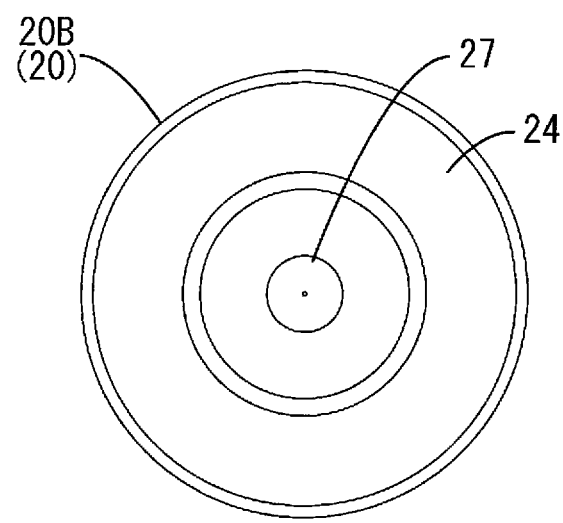
FIG. 14 is a plan view illustrating a multifunction-type holding member.

As illustrated in FIGS. 14 and 15, the support portion 26 is provided at substantially a center of the main body 24. The support portion 26 is provided so as to overlap the fixing portion 25 provided on the rear-surface side in a plan view. Specifically, the support portion 26 and the fixing portion 25 are provided concentrically in a plan view. With such an arrangement, in mounting the multifunction-type holding member 20B to the chassis 14, an operator uses the support portion 26 as the operating portion. Accordingly, the operator sees the support portion 26 that is exposed to the front-surface side and easily knows the position of the fixing portion 25 that is provided on the rear-surface side and is not seen by the operator. This improves operability of inserting the fixing portion 25 trough the communication holes 22*c*, 23*c*, the through hole 18*b* and the mounting hole 14*e*.

In the LED unit U, the board reflection sheet 23 is provided on the LED board 18 without using fixing means such as an adhesive layer and is not fixed to the LED board 18. If the board reflection sheet 23 is fixed to the LED board 18 and the board reflection sheet 23 is thermally expanded or contracted, warping or wrinkles may be intensively caused in portions that are not fixed to the LED board 18 (portions that project from the outer edge of the LED board 18) or portions that are fixed with low fixing force, and this may cause local deformation. However, the board reflection sheet 23 that is not fixed to the LED board 18 like the present embodiment does not cause such problems. However, if the board reflection sheet 23 is not fixed to the LED board 18, the board reflection sheet 23 may be deformed in the Z-axis direction so as to be close to or separated from the diffuser lens 19, and therefore relative positional relationship between the board reflection sheet 23 and the diffuser lens 19 in the Z-axis direction may not be fixed and may be unstable. To deal with such problems, in the present embodiment, restriction members 27 that restrict the relative positional relationship between the diffuser lens 19 and the board reflection sheet 23 in the Z-axis direction are provided. In the following, the restriction member 27 will be explained in detail.

As illustrated in FIGS. 7 and 8, the restriction members 27 are integrally formed with the diffuser lens 19. Each of the restriction members 27 is formed to project from the light entrance surface 19*b* of the lens main body 19*a* (a surface of the diffuser lens 19 that faces the board reflection sheet 23) toward the board reflection sheet 23 so as to be parallel to the mounting portion 19*e*. The restriction member 27 has a projection dimension from the light entrance surface 19*b* that is smaller than the projection dimension of the mounting portion 19*e* and also smaller than a distance between the light entrance surface 19*b* and the board reflection sheet 23. Therefore, a specified gap C2 is ensured between the projection distal end of the restriction member 27 and the board reflection sheet 23 and they are not in contact with each other. The board reflection sheet 23 is not pressed by the restriction members 27 in a state that the board reflection sheet 23 is flat along the LED board 18. Therefore, the board reflection sheet 23 does not receive stress from the restriction members 27 and has sufficient allowance for thermal expansion or thermal contraction. Difference between the projection dimension of the restriction member 27 and a distance between the light entrance surface 19*b* and the board reflection sheet 23 is smaller than a thickness of the chassis reflection sheet 22. Therefore, the projection distal end of the restricting member 27 enters the lens fitting hole 22*b* in the Z-axis direction.

The restriction members 27 are provided to have the gap C2 from the board reflection sheet 23. If the board reflection sheet 23 displaces so as to be lifted up from the LED board 18 to the front-surface side, the restriction members 27 come in contact with the board reflection sheet 23 from the front-surface side so as to restrict further deformation of the board reflection sheet 23. In other words, if the board reflection sheet 23 is deformed so as to be closer to the diffuser lens 19, the board reflection sheet 23 is pressed by the restricting members 27 so as to restrict the displacement amount to be within a range of the gap C2. This restricts the board reflection sheet 23 from approaching the diffuser lens 19. This keeps a distance between the light entrance surface 19*b* of the diffuser lens 19 and the board reflection sheet 23 in the Z-axis direction (that is a distance in the direction in which the board reflection sheet 23 relatively approaches and is separated from the diffuser lens 19) to be a specified distance or more (the projection dimension of the restriction member 27 or greater). A portion of the board reflection sheet 23 that overlaps the restriction member 27 in a plan view is a contact portion 28 that can be in contact with the restriction member 27. Each restriction member 27 is formed in substantially a spherical shape as a whole (a circular shape in a plan view) and has a spherical (curved) peripheral surface (a surface facing the board reflection sheet 23). Therefore, the restriction member 27 comes in point contact with the contact portion 28 of the board reflection sheet 23. This reduces a contact area of the restriction member 27 that comes in contact with the board reflection sheet 23 to be smallest.

Next, a plan arrangement of the restriction members 27 will be explained in detail. As illustrated in FIG. 17, each restriction member 27 is formed in substantially a point-like shape with a plan view and a plurality of restriction members 27 are arranged with dispersed in a surface area of the light entrance surface 19*b*. Specifically, three restriction members 27 are provided in positions on the light entrance surface 19*b* that are closer to the outer peripheral edge from the light entrance side recess 19*d* (the LED 17) like the mounting portions 19*e*. The three restriction members 27 are provided such that lines connecting the restriction members 27 form substantially a right triangle in a plan view. The three restriction members 27 are provided at equal angular intervals such that they are arranged in a surface area of the light entrance surface 19*b* of the lens body 19*a* at angular intervals of approximately 120 degrees. The restriction members 27 are arranged at equal intervals such that each distance between the adjacent restriction members 27 is equal and a distance between each restriction member 27 and the LED 17 (a center of the diffuser lens 19) is equal. One of the restriction members 27 provided on an upper side in FIG. 17 overlaps the long-side outer edge of the LED board 18. The other restriction members 27 are provided in slightly inner-side positions from the long-side outer edge of the LED board 18. Namely, each of the restriction members 27 that are arranged at equal angular intervals are arranged so as to have a greatest distance from the LED 17.

Each restriction member 27 is provided to be away from each mounting portion 19*e* in a plan view on the light entrance surface 19*b*. Each restriction member 27 and each mounting portion 19*e* is arranged alternately in a circumferential direction of the diffuser lens 19. Specifically, each restriction member 27 is arranged at an angular interval of approximately 60 degrees with respect to each mounting portion 19*e*, and lines connecting the restriction members 27 and the mounting portions 19*e* form substantially a regular hexagon in a plan view. Each restriction member 27 and each mounting portion 19*e* arranged to face each other with sandwiching the LED 17 therebetween. The mounting portion 19*e* is arranged at an angular interval of 180 degrees with respect to the restriction member 27. The restriction member 27 is arranged at an angular interval of 180 degrees with respect to the mounting portion 19*e*. A distance between each restriction member 27 and each mounting portion 19*e* that are adjacent to each other in the circumferential direction of the diffuser lens 19 is substantially equal. Therefore, the restriction members 27 and the mounting portions 19*e* are arranged at equal intervals. A distance from each restriction member 27 to the LED 17 (a center of diffuser lens 19) and a distance from each mounting portion 19*e* to the LED 17 are substantially equal. Therefore, each restriction member 27 and each mounting portion 19*e* are arranged symmetrically with respect to the LED 17. The restriction member 27 has a diameter substantially same as the mounting portion 19*e*. The contact portions 28 of the board reflection sheet 23 are provided similar to the restriction members 27 in a plan view and the arrangement of the contact portions 28 will not be explained.

The construction of the present embodiment has been explained above and an operation thereof will be explained. The liquid crystal panel 11 and the backlight device 12 are separately manufactured and they are assembled to each other with the bezel 13 and the like. Accordingly, the liquid crystal display device 10 as illustrated in FIGS. 4 and 5 is manufactured. An assembling operation in manufacturing the backlight device 12 will be explained in detail.

In the present embodiment, prior to the assembling of parts to the chassis 14, the LED units U are manufactured. In manufacturing the LED units U, the LEDs 17, the board reflection sheets 23 and the diffuser lenses 19 are mounted to the LED units U. After the LEDs 17 are mounted in specified positions on the LED board 18 as illustrated in FIG. 10, the board reflection sheet 23 is covered on the front-surface side of the LED board 18. At this time, as illustrated in FIG. 16, each LED 17 fits through each LED fitting hole 23a of the board reflection sheet 23 and each communication hole 23c is communicated with each through hole 18b. Thereafter, as illustrated in FIG. 11, the diffuser lens 19 is mounted to the LED board 18 so as to cover each LED 17. At this time, each mounting portion 19e of the diffuser lens 19 is fitted through each mounting portion fitting hole 23b of the board reflection sheet 23 and fixed to the LED board 18 by adhesive (via an adhesive layer) put on the distal end portion of the mounting portion 19e. Each mounting portion 19e is able to come in contact with each mounting portion fitting hole 23b with their facing peripheral surfaces. Therefore, in mounting the diffuser lenses 19 to the LED board 18, a position of the diffuser lens 19 is determined two-dimensionally in the X-axis direction and the Y-axis direction with respect to the LED board 18 and the board reflection sheet 23. In the mounted state of the diffuser lens 19, a specified gap C1 is ensured between the facing peripheral surfaces of each mounting portion 19e and each mounting portion fitting hole 23b as illustrated in FIG. 17. Accordingly, the LED unit U is manufactured with integrally mounting the LEDs 17, the board reflection sheets 23 and the diffuser lenses 19 to the LED board 18.

In the LED unit U, as illustrated in FIG. 8, each restriction member 27 of the diffuser lens 19 and each contact portion 28 of the board reflection sheet 23 ensure the gap C2 therebetween and face each other so as not to be in contact with each other. Therefore, if vibration or shock is applied to the LED units U during transporting them and the board reflection sheet 23 may be deformed to approach the diffuser lens 19, the restriction members 27 come in contact with the contact portions 28 such that the board reflection sheet 23 is not further deformed to approach the diffuser lens 19. Further, the restriction members 27 are arranged in a surface area of the facing surfaces of the diffuser lens 19 and the board reflection sheet 23 with being dispersed at equal angular intervals. Therefore, the deformation of the board reflection sheet 23 is effectively restricted with balanced in the surface area. This keeps the distance between the light entrance surface 19b of the diffuser lens 19 and the board reflection sheet 23 to be a specified distance or more. The above described operations and effects are obtained in the case that the LED units U are assembled to the backlight device 12 and also in the case that the backlight device 12 is assembled to the liquid crystal display device 10.

Next, an assembling operation of the parts to the chassis 14 will be explained. The LED unit U is housed in the chassis 14 through the opening 14b from the front-surface side and to be arranged in a predetermined mounting position on the bottom plate 14a. At this time, each through hole 18b of the LED board 18 in each LED unit U is arranged to correspond to each mounting hole 14e of the chassis 14 to be communicated with each other. The adjacent connector portions 18a are fitted and connected to each other to establish mutual electric connection between the LED boards 18 that are arranged in adjacent to each other in the X-axis direction. The LED boards 18 that are arranged in the X-axis direction are not necessarily connected in the chassis 14 but may be connected outside of the chassis 14. After all the LED units U are arranged, the chassis reflection sheet 22 will be provided in the chassis 14. At this time, each lens fitting hole 22b of the chassis refection sheet 22 is positioned to correspond to each diffuser lens of the LED unit U to fit each diffuser lens 19 through the lens fitting hole 22b (FIG. 3). After providing the chassis reflection sheet 22, the chassis reflection sheet 22 overlaps from the front-surface side almost entire portion of the board reflection sheet 23 except for the portion that overlaps the diffuser lens with a plan view (FIGS. 6 to 8). Entire portion of the edge portion of the lens fitting hole 22b of the chassis reflection sheet 22 overlaps the front surface of the board reflection sheet 23. Each communication hole 22c of the chassis reflection sheet 22 corresponds to each communication hole 23c of the board reflection sheet 23, each through hole 28b of the LED board 18, and each mounting hole 14e of the chassis 14 to be communicated with each other (FIG. 9). Thereafter, the holding members 20 will be assembled.

To mount each holding member 20 to the chassis 14, the each holding member 20 is put within the chassis 14 from the front-surface side through the opening 14b and the fixing portion 25 is inserted through each of the holes 14e, 18b, 22c, 23c. In the insertion process of the fixing portion 25, each elastic stopper 25b is pressed by edges of each of the holes 14e, 18b, 22c, 23c to be elastically deformed and temporally contracted into the recess 25c. The fixing portion 25 is inserted to the mounting hole 14e such that each elastic stopper 25 passes through the mounting hole 14e and reaches the rear-surface side of the chassis 14. Then, as illustrated in FIG. 9, each elastic stopper 25b elastically recovers its original shape and the stopper portion 25d is stopped by the edge portion of the mounting hole 14e from the rear-surface side. Accordingly, the holding member 20 is prevented from dropping off from the chassis 14 and fixed to be mounted to the chassis 14. In such amounted state, the LED board 18 and the reflection sheets 22, 23 are collectively sandwiched between the main body 24 of the holding member 20 and the bottom plate 14a of the chassis 14.

In mounting the holding member 20 to the chassis 14, the support portion 26 of the multifunction-type holding member 20B is used as an operation portion. Therefore, in mounting the multifunction-type holding member 20B to the chassis 14, an operator holds the support portion 26 to operate the multifunction-type holding member 20B. In such a state, the support portion 26 and the fixing portion 25 are concentrically overlapped with each other in a plan view. Therefore, an operator easily knows the position of the fixing portion 25 and inserts the fixing portion 25 into the mounting hole 14e smoothly.

The fixing portion 25 passes through each of the reflection sheets 22, 23 and the LED board 18, and this prevents the reflection sheets 22, 23 and the LED board 18 from carelessly moving in the X-axis direction and the Y-axis direction and positions of the reflection sheets 22, 23 and the LED board 18 can be determined in a same direction. Further, the fixing portion 25 passes through the mounting hole 14e formed in the chassis 14 to be mechanically stopped by and fixed to the chassis 14. Therefore, compared to a case in which the fixing portion 25 is fixed by an adhesive agent, the fixing is achieved easily and inexpensively and the holding member 20 can be easily detached from the chassis 14 in case of maintenance or disposal.

Thereafter, the optical member 15 is provided to chassis 14 so as to cover the opening 14b. In mounting the optical member 15, the diffuser 15a is first provided and thereafter the optical sheet 15b is provided thereon. As illustrated in FIGS. 4 and 5, an outer peripheral edge portion of the optical member 15 is placed on the receiving plate 14d and a middle portion of the optical member 15 is supported by the support portion 26 of the multifunction-type holding member 20B. Thereafter, the frame 16 is mounted to the chassis 14 and the outer peripheral edge portion of the optical member 15 is sandwiched between the frame 16 and the receiving plate 14d and manufacturing of the backlight device 12 is completed. In assembling the backlight device 12 and the liquid crystal panel 11, the liquid crystal panel 11 is placed on the frame 16 and thereafter the bezel 13 is placed on the front-surface side of the liquid crystal panel 11 and fixed with screws. Accordingly, the liquid crystal panel 11 is sandwiched between the frame 16 and the bezel 13 and the liquid crystal panel 11 is provided integrally with the backlight device 12, and manufacturing of the liquid crystal display device 10 is completed.

In using the liquid crystal display device 10 thus manufactured, each LED 17 provided in the backlight device 12 is lit on to supply image signals to the liquid crystal panel 11. Accordingly, images are displayed on the display surface of the liquid crystal panel 11. As illustrated in FIGS. 7 and 8, light emitted from the LEDs 17 that are lit on first enters the light entrance surface 19b of the diffuser lens 19. At this time, most of rays of light emitted from the LEDs 17 enters the slanted surface of the light entrance side recess 19d and is refracted at a wide angle according to the slanted angle of the slanted surface and enters the diffuser lens 19. The light entering the diffuser lens 19 travels through the diffuser lens 19 and thereafter exits from the light exit surface 19c. The light exit surface 19c is formed in a substantially flat spherical shape. Therefore, the light is further refracted at a wide angle at a border between the light exit surface 19c and an external air layer and exits from the light exit surface 19c. The light exit side recess 19f of substantially a conical shape is formed in a portion of the light exit surface 19c in which the amount of light from the LEDs 17 is greatest and the peripheral surface of the light exit side recess 19f is formed in substantially a flat spherical surface. Therefore, the light can be refracted in a wide angle at a peripheral surface of the light exit side recess 19f and exits therefrom or reflected toward the LED board 18 side. The light returned to the LED board 18 side is reflected by the board reflection sheet 23 toward the diffuser lens 19 side (to the light entrance surface 19b) and enter the diffuser lens 19 again to be effectively used. Accordingly, improved brightness is obtained.

A distribution of light that is reflected by the board reflection sheet 23 and enters the light entrance surface 19b of the diffuser lens 19 may change according to positional relationship in the Z-axis direction between the diffuser lens 19 and the board reflection sheet 23. Specifically, for example, the board reflection sheet 23 may be provided to be slanted with the LED board 18 and the diffuser lens 19 and a distance between the board reflection sheet 23 and the diffuser lens 19 may change within a surface area of the light entrance surface 19b. In such a case, the light entrance efficiency of the light reflected by the board reflection sheet 23 and entering the light entrance surface 19b may be uneven within a surface area of the light entrance surface 19b. Normally, the diffuser lens 19 is optically designed such that light exits so as to have a predetermined distribution according to entering light having a predetermined distribution. Therefore, if the distribution of entering light changes, the distribution of exiting light also changes, and this may fail in achieving stable optical ability. In the present embodiment, the restriction members 27 are provided on the diffuser lens 19 to restrict the positional relationship in the Z-axis direction between the diffuser lens 19 and the board reflection sheet 23. Therefore, the distribution of light reflected by the board reflection sheet 23 and entering the diffuser lens 19 is less likely to change. This stabilizes the distribution of light entering the diffuser lens 19 and the distribution of light exiting from the diffuser lens and the original optical ability is stably achieved. In the present embodiment, the gap C2 is ensured between the restriction members 27 and the board reflection sheet 23. This allows deformation of the board reflection sheet 23 within a range of the gap C2. However, the deformation allowance is quite small and this hardly causes optical effects on the distribution of light entering the diffuser lens 19.

The light emitted from the LED 17 to be directed to the diffuser lens 19 (the light entrance surface 19b), the light reflected by the diffuser lens 19 and returned to the LED board 18 side, the light reflected by the board reflection sheet 23 and directed to the diffuser lens 19 side again and the like travel in a space of the gap between the facing surfaces of the diffuser lens 19 and the board reflection sheet 23. The amount of such rays of light increases as is closer to the LED 17 (the light source) in a plan view and decreases as is farther away from the LED 17. Each of the restriction members 28 and the mounting portions 19e that project from the light entrance surface 19b of the diffuser lens 19 toward the board reflection sheet 23 may function as an optical obstacle to the light traveling in the gap. If the light strikes the restriction member 27 or the mounting portion 19e, the light may be retracted to be directed to an unnecessary direction and may not be effectively used. In the present embodiment, each of the restriction members 27 and the mounting portions 19e is provided so as to be farthest away from the LED 17. Accordingly, each of the restriction members 27 and the mounting portions 19e is located in a portion in which the amount of the above-described light is quite small. Accordingly, the restriction members 27 and the mounting portions 19e are less likely to optically affect the above-described light. As illustrated in FIG. 17, each of the restriction members 27 and the mounting portions 19e is provided so as to have an equal distance from the LED 19 and such that one of the restriction members 27 and one of the mounting portions 19e overlap the outer edge of the LED board 18 in a plan view. Accordingly, the restriction members 27 and the mounting portions 19e evenly cause the optical effects on the above-described light and have a maximum distance from the LED 17. Accordingly, the optical effects on the above-described light caused by each of the restriction members 27 and the mounting portions 19e is restricted to be smallest. Further, the restriction members 27 and the mounting portions 19e are arranged alternately along a circumferential direction of the diffuser lens 19 at equal angular intervals. Therefore, the optical effects on the above-described light are caused by each of the restriction members 27 and the mounting portions 19e evenly in a surface area of the light entrance surface 19b and unevenness of the light is less likely to be caused. Accordingly, the amount of light entering the light entrance surface of the diffuser lens 19 is sufficiently ensured and the light distribution is mostly uniform. This improves brightness of the light exiting from the diffuser lens 19 and the brightness distribution is made uniform.

Light emitted from the LED 17 and having high directivity can be diffused by the diffuser lens 19 at a wide angle, and therefore, the distribution of the light reaching the optical member 15 within a surface area of the optical member 15 becomes uniform. In other words, due to the arrangement of the diffuser lens 19, the portion between the adjacent LEDs 17 is less likely to be recognized as a dark portion, and therefore a distance between the LEDs 17 can be increased. This suppresses the brightness unevenness and reduces the number of arranged LEDs 17. Reduction in the number of LEDs 17 increases the distance between the adjacent LEDs 17. The mounting member 20 can be arranged in a space generated by the increased distance and the mounting member 20 fixes the LED board 18.

In using the liquid crystal display device 10, each of the LEDs 17 included in the backlight device 12 is lit on and off, and this may change temperature environment in the backlight device 12. Accordingly, each of the components in the liquid crystal display device 10 may be thermally expanded or contracted. Each board reflection sheet 23 reflects light toward the light entrance surface 19*b* of the diffuser lens 19 at the position closest to the LED 18 and the diffuser lens 19. The board reflection sheet 23 has an important function in optical design of the backlight device 12. Therefore, if the board reflection sheet 23 is thermally expanded or contracted, local deformation such as warping or deflection occurs, and this may greatly affect optical ability of the backlight device 12. In the present embodiment, as illustrated in FIG. 8, the gap C2 is ensured between the restriction members 27 of the diffuser lens 19 and the board reflection sheet 23 and they are not in contact with each other. Stress is not applied from the restriction members 27 to the board reflection sheet 23. The gap C1 is ensured between the mounting portion 19*e* and the mounting portion fitting hole 23*b* and no stress is caused therebetween. Therefore, the board reflection sheet 23 is allowed to be thermally expanded or contracted to some extent, and accordingly, the local deformation such as warping or deflection is less likely to occur in the board reflection sheet 23. In other words, the board reflection sheet 23 is allowed to be expanded or contracted in its entire area and the entire area of the board reflection sheet 23 can absorb deflection or warping that may be caused by the expansion or contraction. Therefore, the board reflection sheet 23 is ensured to be flat in its entire area and local occurrence of deflection or warping is less likely to be caused.

As is explained above, the LED unit U of the present embodiment includes the LED 17 that is the light source, the diffuser lens 19 provided to face the light emitting surface 17*a* of the LED 17, and the board reflection sheet 23 provided to face the surface of the diffuser lens 19 facing the LED 17 and reflecting the light. The LED unit U further includes the restriction member 27 that projects from the diffuser lens 19 toward the board reflection sheet 23 and restricts the positional relationship between the diffuser lens 19 and the board reflection sheet 23.

Accordingly, the light emitted from the LED 17 passes through the diffuser lens 19 facing the light emitting surface 17*a* and this applies optical effects to the light and the light that has received the optical effects exits from the diffuser lens 19. Some of the light emitted from the LED 17 may be reflected by the diffuser lens 19 and returned to the LED 17 side. Such light is reflected by the board reflection sheet 23 and returned to the diffuser lens 19 side again to be effectively used. The distribution of light reflected by the board reflection sheet 23 and entering the diffuser lens 19 may change according to the positional relationship between the diffuser lens 19 and the board reflection sheet 23. In the present embodiment, the restriction members 27 projecting from the diffuser lens 19 toward the board reflection sheet 23 restrict the positional relationship between the diffuser lens and the board reflection sheet 23. Therefore, the distribution of light reflected by the board reflection sheet 23 and entering the diffuser lens 19 is less likely to change and this stabilizes the distribution of light exiting from the diffuser lens 19.

The restriction members 27 are formed to ensure the gap C2 from the board reflection sheet 23. Accordingly, the restriction members 27 and the board reflection sheet 23 are not in contact with each other. Therefore, the board reflection sheet 23 is easily expanded or contracted due to thermal expansion or thermal contraction and deformation such as deflection or warping is less likely to occur in the board reflection sheet 23. Accordingly, unevenness is less likely to be caused in the light reflected by the board reflection sheet 23.

The restriction members 27 are arranged with dispersed within a surface area of the facing surfaces of the diffuser lens 19 and the board reflection sheet 23 (the light entrance surface 19*b*). Accordingly, the restriction members 27 provided with dispersed within a surface area of the facing surfaces of the diffuser lens 19 and the board reflection sheet 23 effectively restrict the positional relationship between the diffuser lens 19 and the board reflection sheet 23.

The restriction members 27 are arranged at equal intervals. Accordingly, the positional relationship between the diffuser lens 19 and the board reflection sheet 23 can be restricted with balanced in a surface area of the facing surfaces of the diffuser lens 19 and the board reflection sheet 23. This stabilizes the distribution of light reflected by the board reflection sheet 23 and entering the diffuser lens 19.

The LED 17 is a point light source in a plan view. Even if the light emitted from the LED 17 has high directivity, the light passes through the diffuser lens 19 such that the optical effects of lowering the directivity is applied to the light and the light exits from the diffuser lens 19.

The restriction members 27 are arranged to be far away from the LED 17 in a plan view. Accordingly, the amount of light reflected by the diffuser lens 19 tends to have a distribution so as to be inversely proportional to the distance from the LED 17. The restriction members 27 are provided in positions far away from the LED 17 and having a relatively small amount of light reflected by the diffuser lens 19. This reduces optical effects caused by the restriction members 27 on the light reflected by the diffuser lens 19 and the light reflected by the board reflection sheet 23. Accordingly, the light effectively enters the diffuser lens 19.

Each of the restriction members 27 is arranged so as to be have an equal distance from the LED 17. Accordingly, the distance between each restriction member 27 and the LED 17 is equal and therefore optical effect is evenly caused by each of the restriction members on the light reflected by the diffuser lens 19 and the light reflected by the board reflection sheet 23. Therefore, unevenness is less likely to be caused in the light entering the diffuser lens 19.

The restriction members 27 are provided at equal angular intervals. Accordingly, unevenness is less likely to be caused in the light entering the diffuser lens 19.

The LEDs 17 are mounted on the LED board 18 and the board reflection sheet 23 is overlapped the surface of the LED board 18 on which the LEDs 17 are mounted. The LED board 18 has the LED fitting holes 23*a* through which the LEDs 17 are fitted through. Accordingly, each of the LEDs 17 mounted on the LED board 18 is fitted through the LED fitting hole 23*a* of the board reflection sheet 23 such that the light emitting surface 17a faces the diffuser lens 19 and the light effectively enters the diffuser lens 19.

The restriction member 27 is provided to overlap the outer edge of the LED board 18 in a plan view. Accordingly, the board reflection sheet 23 is sandwiched between the restriction member 27 and the LED board 18 so as to effectively restrict the positional relationship between the diffuser lens 19 and the board reflection sheet 23. The restriction member 27 is provided so as to overlap the outer edge of the LED board 18 in a plan view and so as to be farthest away from the LED 17. The restriction members 27 are less likely to optically affect the light reflected by the diffuser lens 19 and the light reflected by the board reflection sheet 23. Therefore, the light can effectively enter the diffuser lens 19.

The board reflection sheet 23 is greater in size than the LED board 18 in a plan view. The LED board 18 is relatively smaller in size than the board reflection sheet 23 in a plan view. This reduces a material cost of the LED board 18. The LED board 18 is reduced in size and the board reflection sheet 23 that is greater in size than the LED board 18 is used. Accordingly, the light from the diffuser lens 19 is effectively reflected by the board reflection sheet 23 toward the diffuser lens 19.

The mounting portions 19e are provided on the diffuser lens 19 so as to project toward the LED board 18 and are mounted to the LED board 18. The mounting portions 19e are provided to be far away from the LED 17 in a plan view. Accordingly, the diffuser lens 19 is mounted to the LED board 18 via the mounting portions 19e. The mounting portions 19e are provided to be away from the LED 17 in a plan view. Therefore, the mounting portions 19e are less likely to optically affect the light reflected by the diffuser lens 19 and the light reflected by the board reflection sheet 23. Accordingly, the light effectively enters the diffuser lens 19.

The mounting portion fitting holes 23b through which the mounting portions 19e are fitted are formed in the board reflection sheet 23. Accordingly, each of the mounting portions 19e is fitted through the mounting portion fitting hole 23b so as to determine relative positions of the board reflection sheet and the diffuser lens 19 in the direction along the facing surfaces.

The gap C1 is ensured between the mounting portion fitting hole 23b and the mounting portion 19e. Accordingly, the thermal expansion or thermal contraction of the board reflection sheet 23 is allowed within a range of the gap C1.

The restriction members 27 are formed integrally with the diffuser lens 19 and provided to be away from the mounting portions 19e on the diffuser lens 19. Accordingly, the positional relationship between the diffuser lens 19 and the board reflection sheet 23 is restricted in a position far away from the mounting portions 19e. If the restriction members are provided close to the mounting portions 19e on the diffuser lens 19, the restriction members may be inserted in the mounting portion fitting holes 23b. However, such a problem is not caused in the present embodiment and the restricting function of the restriction members 27 is surely achieved.

The mounting portions 19e and the restriction members 27 are alternately provided in a circumferential direction of the diffuser lens 19. Accordingly, the mounting portions 19e and the restriction members 27 are provided with preferably dispersed in a surface area of the facing surfaces of the diffuser lens 19 and the board reflection sheet 23. Therefore, the diffuser lens 19 is supported by the mounting portions 19e with balanced and the restriction members 27 restrict the positional relationship between the diffuser lens 19 and the board reflection sheet 23 with balanced.

The mounting portions 19e and the restriction members 27 are provided at equal angular intervals. Accordingly, the mounting portions 19e and the restriction members 27 are provided with balanced in a surface area of the facing surfaces of the diffuser lens 19 and the board reflection sheet 23. Therefore, the restricting function of the restriction members 27 and the supporting function of the mounting portions 19e supporting the diffuser lens 19 are effectively achieved.

Each of the mounting portions 19e and each of the restriction members 27 are provided to have an equal distance from the LED 17. Accordingly, each mounting portion 19e and each restriction member 27 has optical effects evenly on the light reflected by the diffuser lens 19 and the light reflected by the board reflection sheet 23. Therefore, unevenness is less likely to occur in the light entering the diffuser lens 19.

The LED 17 is arranged at a center of the diffuser lens 19. Accordingly, the optical design of the diffuser lens 19 is easy and the manufacturing cost of the diffuser lens 19 can be lowered.

The LED 17 is used as a point light source. This achieves improved brightness and low power consumption.

The diffuser lens 19 that is a light diffuser component diffusing light is used as the optical component. Accordingly, the light emitted from the LED 17 is diffused by the diffuser lens 19 that is the light diffuser component and exited from the diffuser lens 19. If the light emitted from the LED 17 has high directivity, the directivity can be effectively lowered.

The restriction members 27 are integrally provided with the diffuser lens 19. Compared to a case in that restriction members are integrally provided with the sheet-like board reflection sheet 23, the manufacturing cost can be lowered.

The board reflection sheet 23 has the contact portions 28 each of which faces the restriction member 27 and comes in contact with the restriction member 27. Accordingly, the contact portions 28 facing the restriction members 27 come in contact with the restriction members 27 respectively such that the positional relationship between the diffuser lens 19 and the board reflection sheet 23 is surely restricted.

The restriction member 27 is formed to have a curved surface that faces an opposing component. Accordingly, if the restriction member 27 comes in contact with the opposing component, the opposing component easily moves smoothly with respect to the restriction member 27. This allows the board reflection sheet 23 to be thermally expanded or contracted to greater extent.

The restriction member 27 has a spherical surface that faces the opposing component. If the restriction member 27 is in contact with the opposing component, the opposing component easily moves smoothly with respect to the restriction member 27, and this allows the board reflection sheet 23 to be thermally expanded or contracted to greater extent.

The board reflection sheet 23 is greater in size than the diffuser lens 19 in a plan view. Accordingly, the light reflected by the diffuser lens 19 can be reflected by the board reflection sheet 23 toward a wider range area. This further improves light use efficiency.

The diffuser lens 19 that diffuses light is used as the optical lens. Accordingly, the light emitted from the LED 17 is diffused by and exited from the diffuser lens 19 and unevenness is less likely to be caused in the exiting light.

The backlight device 12 of the present embodiment includes the above-configured LED unit U, the chassis 14 that houses the LED unit U therein and the chassis reflection sheet 22 that is provided along an inner surface of the chassis 14 and has the lens fitting hole 22b through which the diffuser lens 19 is fitted through. In such a backlight device 12, the LED unit U restricts unevenness caused in the light exiting from the diffuser lens 19 and therefore unevenness is less likely to be caused in the exiting light in the backlight device 12. In the backlight device 12, the board reflection sheet 23 is provided on the LED board 18 including the portion within the lens fitting hole 22b in a plan view so as to overlap the edge portion of the lens fitting hole 22b in a plan view. Accordingly, the light traveling in a space within the lens fitting hole 22b of the chassis reflection sheet 22 is effectively reflected by the board reflection sheet 23 toward the diffuser lens 19 and this improves light use efficiency.

The liquid crystal display device 10 includes the backlight device 12 and the liquid crystal panel 11 that displays using light from the backlight device 12. In such a liquid crystal display device 10, the backlight device 12 that supplies light to the liquid crystal panel is less likely to cause unevenness in the exiting light. This achieves display having excellent display quality.

As described above, the first embodiment of the present invention has been illustrated. However, the present invention is not limited to the above embodiment, and may employ following various modifications, for example. In the following modifications, the same constituent parts and constituent elements as those of the above embodiment are indicated by the same symbols, and will not be explained.

First Modification of First Embodiment

A first modification of the first embodiment will be explained with reference to FIG. 18. The projection dimension of a restriction member 27-1 is changed.

As illustrated in FIG. 18, the restriction member 27-1 has a projection dimension from the light entrance surface 19b of the diffuser lens 19 that is substantially equal to a distance between the light entrance surface 19b and the board reflection sheet 23. The projection dimension of the restriction member 27-1 is smaller than the projection dimension of the mounting portion 19e. The difference between the projection dimensions of the restriction member 27-1 and the mounting portion 19e is substantially equal to a thickness dimension of the board reflection sheet 23. Therefore, in a state that the diffuser lens 19 is mounted to the LED board 18, a projection distal end of the restriction member 27-1 is in contact with the board reflection sheet 23 without having any gap therebetween. That is, the board reflection sheet 23 is sandwiched between the LED board 18 and the restriction member 27-1 so as not to move in the Z-axis direction. The board reflection sheet 23 does not get close to the diffuser lens 19. This maintains the constant positional relationship between the board reflection sheet 23 and the light entrance surface 19b of the diffuser lens 19 in the Z-axis direction.

As is explained above, according to the present modification, the restriction members 27-1 are formed to be in contact with the board reflection sheet 23 without having a gap therebetween. Since the restriction members 27-1 are formed without having a gap between the restriction members 27-1 and the diffuser lens 19, the board reflection sheet 23 is not modified so as to get close to the diffuser lens 19 and the positional relationship between the diffuser lens 19 and the board reflection sheet 23 is kept constant. Accordingly, the distribution of light reflected by the board reflection sheet 23 and entering the diffuser lens 19 is stabilized.

Second Embodiment

A second embodiment of the present invention will be explained with reference to FIGS. 19 and 20. In the second embodiment, the arrangement of restriction members 127 and the shape of a restriction member 127 are changed. The construction, operations and effects as same as the first embodiment will not explained.

Figure 19:
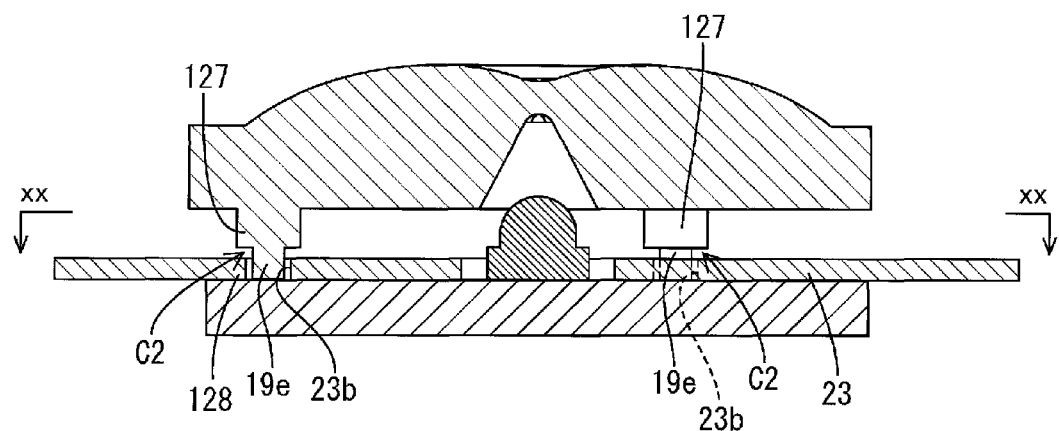
FIG. 19 is a cross-sectional view illustrating an LED unit according to a second embodiment of the present invention taken along the Y-axis direction.
Figure 20:
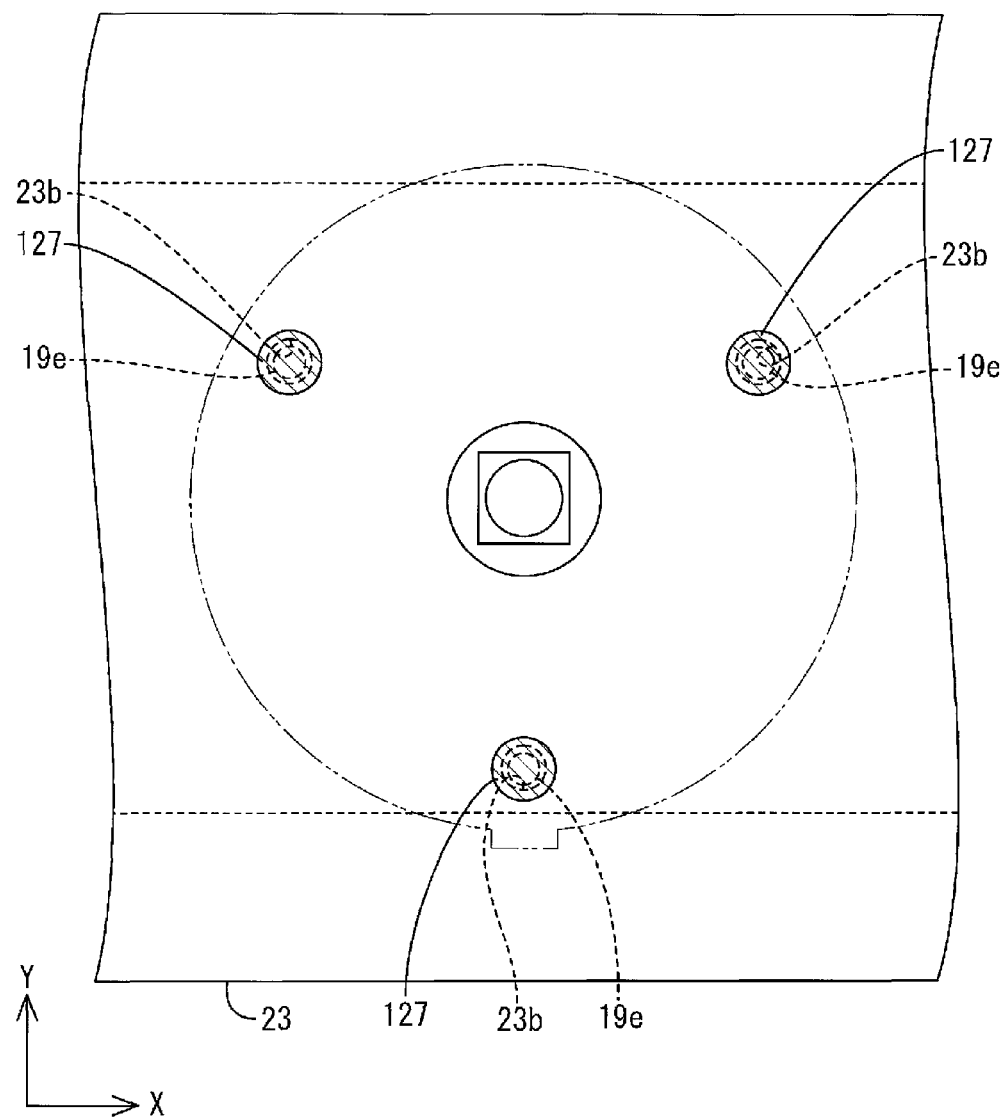
FIG. 20 is a cross-sectional view illustrating the LED unit taken along a xx-xx line in FIG. 19.

As illustrated in FIGS. 19 and 20, the restriction member 127 is provided in adjacent to the mounting portion 19e on the light entrance surface 19b of the diffuser lens 19 and formed continuously from the mounting portion 19e. Specifically, the restriction member 127 is formed to have substantially a circular cross section so as to surround the projection basal portion of the mounting portion 19e on the light entrance surface 19b. The restriction member 127 is connected to an entire outer peripheral surface of the mounting portion 19e. In other words, the mounting portion 19e has the projection basal portion with a step to have a wider diameter than the projection distal end portion and the wider diameter portion configures the restriction member 127. The restriction member 127 is formed continuously from the mounting portion 19e and also formed continuously from the light entrance surface 19b. This reinforces the mounting portion 19e. A surface of the restriction member 127 facing the rear-surface side faces the edge portion of the mounting portion fitting hole 23b of the board reflection sheet 23 with having the gap C2 therebetween. Namely, the edge portion of the mounting portion fitting hole 23b of the board reflection sheet 23 configures a contact portion 128 that comes in contact with the restriction member 127.

As is explained before, in the present embodiment, the restriction member 127 is provided integrally with the diffuser lens 19 and formed continuously from the mounting portion 19e. This improves strength of the mounting portion 19e. The restriction member 127 is formed to surround the mounting portion 19e. This further improves strength of the mounting portion 19e.

The restriction member 127 is provided integrally with the diffuser lens 19 and in adjacent to the mounting portion 19e on the diffuser lens 19. This restricts the positional relationship between the diffuser lens 19 and the board reflection sheet 23 in the position close to the mounting portion 19e. Accordingly, the mounting portion 19e and the restriction member 127 are arranged in one position on the diffuser lens 19, and this simplifies the structure of the diffuser lens 19.

As described above, the second embodiment of the present invention has been illustrated. However, the present invention is not limited to the above embodiment, and may employ following various modifications, for example. In the following modifications, the same constituent parts and constituent elements as those of the above embodiment are indicated by the same symbols, and will not be explained.

First Modification of Second Embodiment

A first modification of the second embodiment will be explained with reference to FIGS. 21 and 22. The shape of a restriction member 127-1 is changed.

Figure 21:
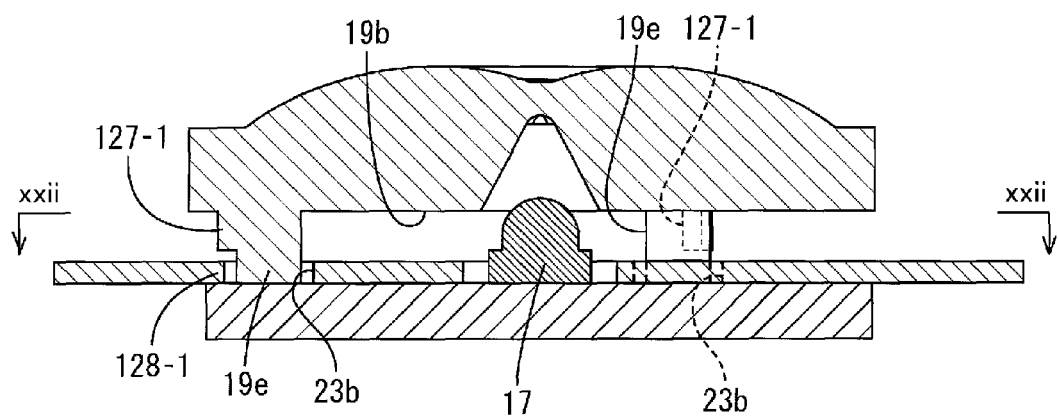
FIG. 21 is a cross-sectional view illustrating an LED unit according to a first modification of the second embodiment taken along the Y-axis direction.
Figure 22:
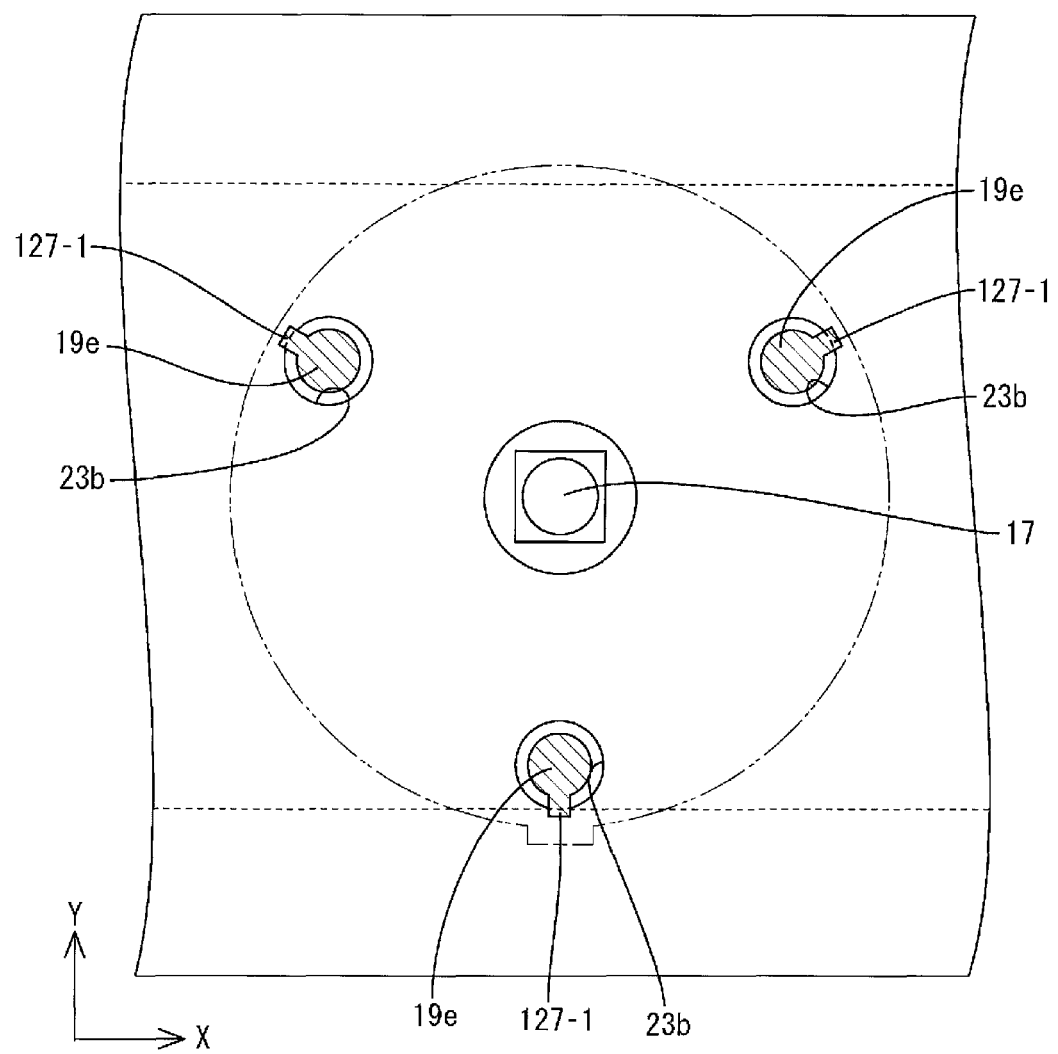
FIG. 22 is a cross-sectional view illustrating the LED unit taken along a xxii-xxii line in FIG. 21.

As illustrated in FIGS. 21 and 22, the restriction member 127-1 is formed to be partially continuous from an outer peripheral surface of the mounting portion 19e. Specifically, the restriction member 127-1 is formed continuously from a part of the outer peripheral surface of the projection basal portion of the mounting portion 19e that is on an opposite side from the LED 17. In other words, the restriction member 127-1 is formed to project outwardly from the projection basal end portion of the mounting portion 19e to an opposite side from the LED 17 (so as to be away from the LED 17). The restriction member 127-1 is provided so as to sandwich the mounting portion 19e with the LED 17 in a plan view. This increases a distance between the LED 17 and the restriction member 127-1 and prevents the restriction member 127-1 from being exposed to the LED 17 side. The restriction member 127-1 is formed to be continuous from the projection basal portion of the mounting portion 19e and the light entrance surface 19b and be able to come in contact with a contact portion 128-1 that is configured by an edge portion of the mounting portion fitting hole 23b.

Second Modification of Second Embodiment

A second modification of the second embodiment will be explained with reference to FIGS. 23 and 24. The shape of a restriction member 127-2 is changed.

Figure 24:
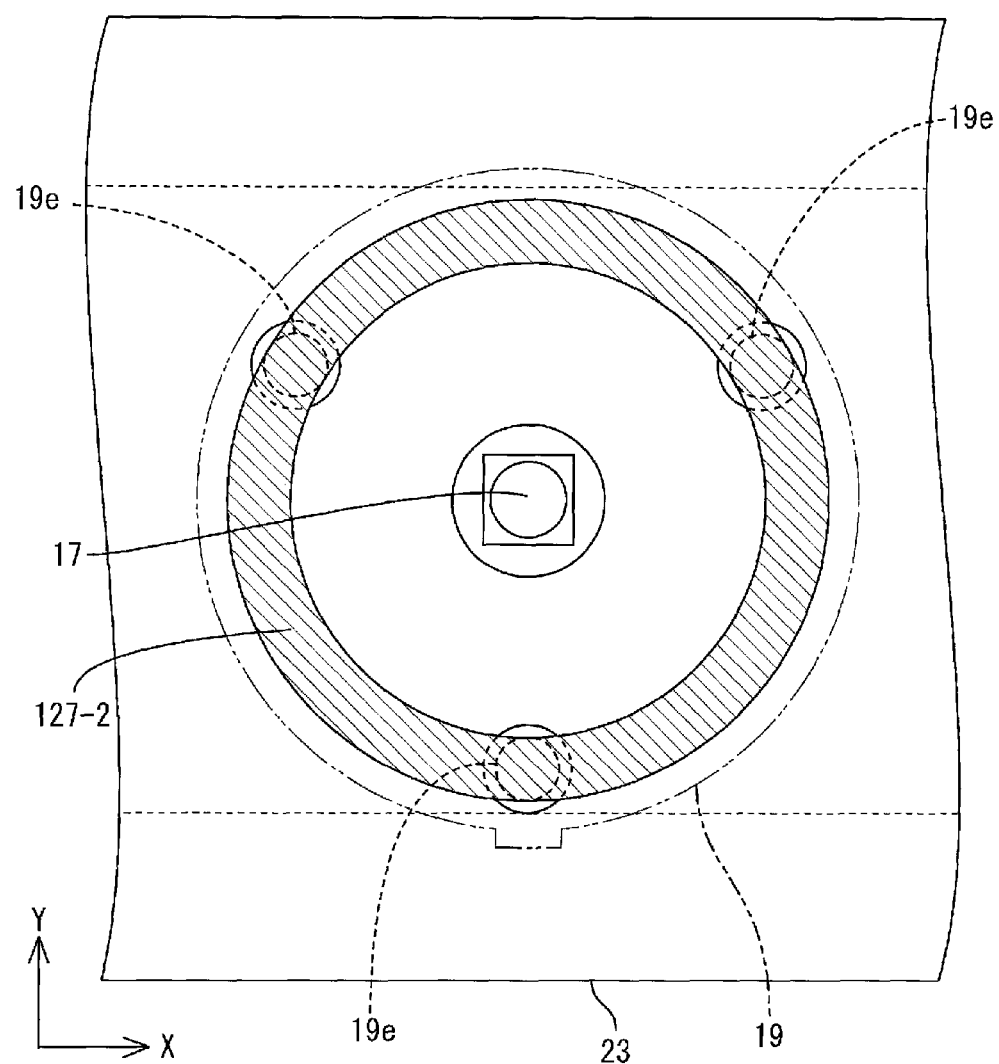
FIG. 24 is a cross-sectional view illustrating the LED unit taken along xxiv-xxiv line in FIG. 23.

As illustrated in FIGS. 23 and 24, the restriction member 127-2 extends along a circumferential direction of the diffuser lens 19 and is formed in an endless loop (in a donut-shape) in a plan view. Specifically, the restriction member 127-2 is formed in a ring shape in a plan view so as to have a constant distance from the LED 17. A radius of the ring of the restriction member 127-2 is substantially equal to a distance between the LED and the mounting portion 19e. The restriction member 127-2 extends along the circumferential direction of the diffuser lens 19 over an entire area between the adjacent mounting portions 19e and is formed continuously from each mounting portion 19e. The restriction member 127-2 surrounds the LED 17 over an entire circumferential area of the LED 17. Accordingly, the restriction member 127-2 restricts deformation of the board reflection sheet 23 in a wider area. A contact portion 128-2 on the board reflection sheet 23 that comes in contact with the restriction portion 127-2 is formed in a circular ring shape so as to overlap the restriction member 127-2 in a plan view.

Third Embodiment

A third embodiment of the present invention will be explained with reference to FIG. 25. In the third embodiment, restriction members 227 are provided on a board reflection sheet 223. The construction, operations and effects that are same as the first embodiment will not be explained.

As illustrated in FIG. 25, the restriction member 227 is provided integrally with the board reflection sheet 223. Specifically, the restriction member 227 is a separate component from the board reflection sheet 223. The restriction member 227 is integrally fixed to the board reflection sheet 223 with fixing means such as an adhesive. The restriction member 227 is formed in substantially a block shape and has a surface that faces the light entrance surface 19b of the diffuser lens 19 and is flat and parallel to the light entrance surface 19b. The gap C2 is ensured between the restriction member 227 and the light entrance surface 19b and the board reflection sheet 223 is allowed to be deformed toward the diffuser lens 19 within a range of the gap C2. However, the restriction member 227 comes in contact with the light entrance surface 19b to restrict further deformation. Therefore, portions of the light entrance surface 19b of the diffuser lens 19 that overlap the restriction portions 227 are contact portions 228. A planar arrangement of the restriction members 227 on the board reflection sheet 223 is same as the planar arrangement of the restriction members 27 on the diffuser lens 19 in the first embodiment (see FIG. 17) and will not be explained.

As is explained before, in the present embodiment, the restriction members 227 are provided integrally with the board reflection sheet 223. If the restriction members 27 are provided integrally with the diffuser lens 19 as is in the first embodiment, optical design requires considering that the light entering the diffuser lens 19 travels in the restriction members 27. Compared to such a case, the optical design of the diffuser lens 19 is simple in the present embodiment.

The restriction members 227 are separately provided from the board reflection sheet 223 and are fixed to and integrally provided on the board reflection sheet 223. This simplifies the manufacturing process of providing the restriction members 227 integrally on the board reflection sheet 223.

Fourth Embodiment

Figure 26:
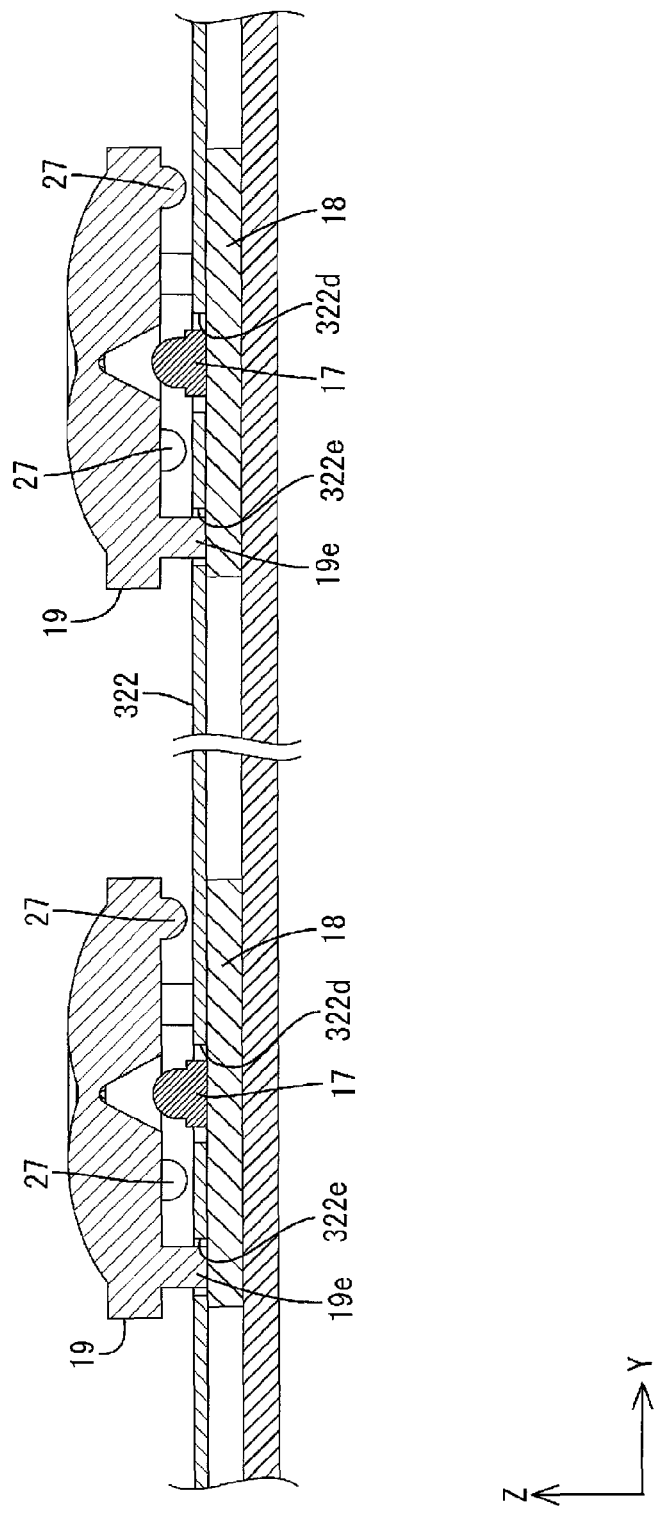
FIG. 26 is a cross-sectional view illustrating a backlight device according to a fourth embodiment of the present invention taken along the Y-axis direction.

A fourth embodiment of the present invention will be explained with reference to FIG. 26. In the fourth embodiment, the board reflection sheet 23 is omitted from the construction of the first embodiment. The construction, operations and effects that are same as the first embodiment will not be explained.

In the present embodiment, the board reflection sheet 23 of the first embodiment is omitted and the shape and the assembling process of the chassis reflection sheet 322 are altered. As illustrated in FIG. 26, the chassis reflection sheet 322 of the present embodiment includes LED fitting holes 322d and mounting portion fitting holes 322e corresponding to the LEDs 17 and the diffuser lenses 19. Each LED 17 is fitted through each of the LED fitting holes 322d and each mounting portion 19e of the lens 19 is fitted through each of the mounting portion fitting holes 322e. The chassis reflection sheet 322 includes the components included in the board reflection sheet 23 of the first embodiment. In assembling, after the LEDs 17 are mounted on the LED board 18, each LED board 18 is housed in the chassis 14 and the chassis reflection sheet 3232 is provided on the front-surface side of the LED boards 18. At this time, each LED 17 is fitted through the LED fitting hole 322d. Thereafter, the diffuser lens 19 is provided for each LED 17 and each mounting portion 19e is fitted through the mounting portion fitting hole 322e. Accordingly, apart of the chassis reflection sheet 322 is provided between the LED board 18 and the diffuser lens 19 and therefore, the light that is reflected by the diffuser lens 19 and directed to the LED board 18 is reflected again by the chassis reflection sheet 322 toward the diffuser lens 19. The positional relationship between the chassis reflection sheet 322 and each diffuser lens 19 in the Z-axis direction is restricted by the restriction members 27 provided on each diffuser lens 19. This achieves good optical ability.

Fifth Embodiment

A fifth embodiment of the present invention will be explained with reference to FIG. 27. In the fifth embodiment, the shapes of restriction members 427 and a board reflection sheet 423 are altered. The construction, operations and effects same as the first embodiment will not be explained.

Figure 27:
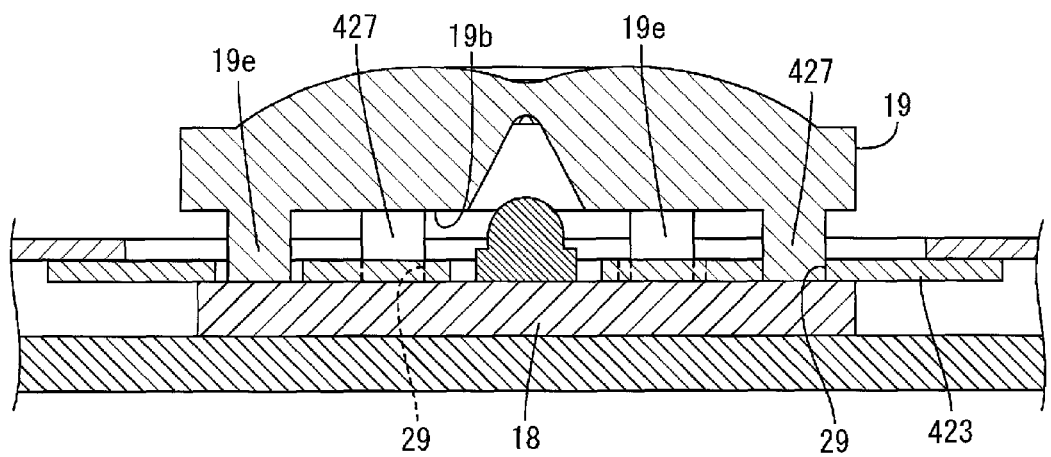
FIG. 27 is a cross-sectional view illustrating an LED unit according to a fifth embodiment of the present invention taken along the Y-axis direction.

As illustrated in FIG. 27, the restriction member 427 has a projection dimension from the light entrance surface 19b of the diffuser lens 19 is substantially equal to a distance between the light entrance surface 19b and the LED board 18, that is, substantially equal to the projection dimension of the mounting portion 19e. The restriction member 427 is formed in substantially a columnar shape (having a circular cross section) having substantially a constant diameter over an entire length similar to the mounting portion 19e. The restriction member 427 has the projection dimension and the diameter substantially equal to those of the mounting portion 19e. The board reflection sheet 423 has contact holes 29 so as to overlap each restriction member 427 in a plan view. The restriction member 427 is fitted through each of the contact holes 29 and a peripheral surface of the contact hole 29 comes in contact with the restriction member 427. The contact hole 29 has a diameter substantially equal to a diameter of the restriction member 427. Therefore, the restriction member 427 is fitted through the contact hole 29 and in such a state, the facing peripheral surfaces of them are in contact with each other over an entire peripheral surfaces. The restriction member 427 is forcibly fitted in the contact hole 29 and this causes frictional resistance force between the restriction member 427 and the contact hole 29. Therefore, even if external force that makes the board reflection sheet 423 closer to the diffuser lens 19 is applied, the frictional resistance force generated by contact between the restriction member 427 and the contact hole 29 restricts deformation of the board reflection sheet 423 toward the diffuser lens 19 side.

As is explained before, in the present embodiment, the contact holes 29 are provided in the board reflection sheet 423 and the restriction member 427 is fitted through each contact hole 29 and the peripheral surface of the contact hole comes in contact with the restriction member 427. Accordingly, the peripheral surface of the contact hole 29 comes in contact with the restriction member 427 that is fitted through the contact hole 29 and frictional force is generated therebetween. This frictional force restricts positional relationship between the diffuser lens 19 and the board reflection sheet 423.

As described above, the fifth embodiment of the present invention has been illustrated. However, the present invention is not limited to the above embodiment, and may employ following various modifications, for example. In the following modifications, the same constituent parts and constituent elements as those of the above embodiment are indicated by the same symbols, and will not be explained.

First Modification of Fifth Embodiment

A first modification of the fifth embodiment will be explained with reference to FIGS. 28 and 29. The shape of a restriction member 427-1 is altered.

As illustrated in FIGS. 28 and 29, the restriction member 427-1 is formed in a frustum of a cone that is tapered toward a distal end. The restriction member 427-1 is formed such that a projection basal portion has a constant diameter and the diameter changes and reduces continuously and gradually toward a projection distal end portion. The restriction member 427-1 has a tapered surface 4271 on its outer peripheral surface. A contact hole 29-1 has a diameter that is smaller than the diameter of the projection basal portion of the restriction member 427-1 and greater than the diameter of the projection distal end portion of the restriction member 427-1. Therefore, the projection distal end portion of the restriction member 427-1 can be fitted in the contact hole 29-1 and in the fitted state, the tapered surface 427a of the restriction member 427-1 and the inner peripheral surface of the contact hole 29-1 face with each other. If external force that makes the board reflection sheet 423 closer to the diffuser lens 19 is applied, the edge portion of the contact hole 29-1 comes in contact with the tapered surface 427a of the restriction member 427-1, and this restricts deformation of the board reflection sheet 423 to the diffuser lens 19 side.

As is explained before, in the present modification, the restriction member 427-1 is formed to be reduced in size toward the distal end and has a tapered surface that faces the peripheral surface of the contact hole 29-1. Accordingly, the restriction member 427-1 is surely in contact with the peripheral surface of the contact hole 29-1 and this surely achieves a restricting function.

Other Embodiments

As describe above, the embodiments of the present invention have been described. However, the present invention is not limited to the above embodiments described in the above description and the drawings. The following embodiments are also included in the technical scope of the present invention, for example.

(1) The arrangement and the number of the restriction members may be altered if necessary. For example, a distance between each restriction member and the LED may be different. The restriction members may be arranged at different angular intervals. Each of the restriction members may be arranged so as not to overlap the outer edge of the LED board in a plan view. Each restriction member may be provided in adjacent to the LED. The number of the restriction members may be two or less for each diffuser lens or may be four or more for each diffuser lens.

(2) The arrangement and the number of mounting portions may be altered as described in (1). The mounting portion supports the diffuser lens to be mounted to the LED board and therefore, three or more mounting portions are preferably provided. However, one mounting portion or two mounting portions may be provided if a stable support function is achieved by changing the shape of the mounting portion.

(3) The relative arrangement of the mounting portion and the restriction member may be altered if necessary. For example, a distance between each restriction member and the LED may be greater or smaller than a distance between each mounting portion and the LED. The restriction members or the mounting portions may be arranged next to each other in a circumferential direction of the diffuser lens. Each restriction member and each mounting portion may be arranged at different angular intervals. A distance between each restriction member and each mounting portion that are adjacent to each other may be different.

(4) The shape of the restriction member may be altered if necessary. For example, the restriction member may be formed in a columnar shape, a prism shape, a conical shape or a pyramid shape. The restriction member may be formed to have a cross section of an angled shape (a triangular shape), a square shape, a spherical shape or an ellipsoidal shape. The restriction member may be formed in a linear shape, an ellipsoidal shape or a corrugated shape in a plan view. The restriction member is not necessarily in point contact with the board reflection sheet (the chassis reflection sheet). The restriction member may be formed to be in line contact or surface contact with the refection sheet.

(5) In the above embodiments (not in the third embodiment), the restriction member projects from the light entrance surface of the diffuser lens. However, the restriction member may project from an outer surface of the diffuser lens.

(6) In the above embodiments, the restriction members are provided on one of the diffuser lens and the board reflection sheet. However, the restriction members may be provided on the diffuser lens and the board reflection sheet. In such a case, the restriction members provided on the diffuser lens and those provided on the board reflection sheet do not overlap with each other in a plan view and each of the restriction members provided on one of the diffuser lens and the board reflection sheet may come in contact with the other one of the diffuse lens and the board reflection sheet. The restriction members provided on the diffuser lens and those provided on the board reflection sheet overlap with each other in a plan view and the restriction members provided on the diffuser lens and those provided on the board reflection sheet may come in contact with each other.

(7) In the second embodiment and the modification thereof, the restriction member is formed continuously from the mounting portion and the light entrance surface. The restriction may be formed continuously from only the mounting portion or only the light entrance surface. The projection direction of the restriction member from the mounting portion may be altered if necessary. For example, the restriction member may project toward the LED.

(8) In the third embodiment, the restriction members are provided integrally with the board reflection sheet. The restriction members may be formed separately from the diffuser lens and the separate restriction members may be fixed to the diffuser lens with fixing means to be provided integrally with the diffuser lens.

(9) In the third embodiment, the restriction members that are separately provided from the board reflection sheet are provided integrally with the board reflection sheet with fixing means. The restriction members may be formed integrally with the board reflection sheet. For example, the board reflection sheet may be partially folded to form a bent portion that projects toward the diffuser lens as the restriction member. A part of the board reflection sheet may be formed to be thick and the thick portion functions as the restriction member.

(10) In the above embodiments, the gap is ensured between the mounting portion of the diffuser lens and the mounting portion fitting hole. Almost no gap may be formed between the mounting portion and the mounting portion fitting hole.

(11) The specific size of the board reflection sheet (relative to the LED board or the diffuser lens) can be altered if necessary. For example, the board reflection sheet may have the short-side dimension substantially same as or smaller than the diameter of the diffuser. The board reflection sheet may have the short-side dimension substantially same as or smaller than the short-side dimension of the LED board. If the board reflection sheet has a size so as to be provided within an inner area of the mounting portions, the mounting portion fitting holes may not be formed.

(12) In the above embodiments, the board reflection sheet overlaps the edge portion of the lens fitting hole of the chassis reflection sheet. However, the inner peripheral surface of the lens fitting hole may be placed on a same plane as the outer peripheral surface of the board reflection sheet and in such a case, the board reflection sheet does not overlap the edge portion of the lens fitting hole. Further, the board reflection sheet may not be necessarily provided over an entire area in the lens fitting hole, but may be provided on a part of an area in the lens fitting hole. That is, a part of the front surface of the LED board may be exposed to the space in the lens fitting hole.

(13) In the above embodiments, the LED board has the short-side dimension smaller than the diameter of the diffuser lens. However, the short-side dimension of the LED board may be equal to or greater than the diameter of the diffuser lens.

(14) In the above embodiments, the LEDs are mounted on the LED board. However, if the LEDs that are not mounted on the LED board are used, the LED board may be omitted.

(15) The mounting positions of the holding members on each LED board and the number of the holding members may be altered if necessary. The mounting positions of the holding members on the chassis and the number of the holding members may be altered if necessary.

(16) In the above embodiments, the fixing portion of an insertion type is used as the mounting mechanism for mounting the holding member to the chassis. However, amounting mechanism of a sliding type may be used. The mounting mechanism of the sliding type includes a fixing portion of a hooked-shape. In such a mounting mechanism, the main body is pressed toward the bottom plate of the chassis and slid along the bottom plate such that the hooked portion of the fixing portion is stopped by the edge portion of the mounting hole.

(17) In the above embodiments, the fixing portion of the holding member is fitted through the mounting hole and stopped by the chassis. However, a specific fixing method for fixing the fixing portion to the chassis may be altered if necessary. For example, the mounting holes and elastic stoppers may be omitted and the basal portion that passes through the through hole of the LED board may be fixed to an inner wall surface of the chassis by an adhesive agent. In such a case, the fixing method may be deposition or welding.

(18) In the above embodiments, the single function-type holding members and the multifunction-type holding members are used. However, only the single function-type holding members may be used or only the multifunction-type holding members may be used. A ratio of the number of the single function-type holding members and the multifunction-type holding members may be altered if necessary.

(19) In the above embodiments, the chassis is made of metal but may be made of other materials such as synthetic resin.

(20) In the above embodiments, the surface of the holding member is white. However, the surface of the holding member may be milky white or silver. A paint of a desired color may be laid over a surface of the holding member to change the color of the surface.

(21) In the above embodiments, the five-LEDs mounted type LED board, the six-LEDs mounted type LED board and the eight-LEDs mounted type LED may be combined to be used. The LED board having the number of LEDs other than five, six and eight may be used.

(22) In the above embodiments, the LED includes an LED chip emitting light of single color of blue and the LED emits white light by a fluorescent material. The LED may include an LED chip emitting ultraviolet rays and emit white light by a fluorescent material.

(23) In the above embodiments, the LED includes an LED chip emitting light of single color of blue and emits white light by a fluorescent material. However, the LED may include three different kinds of LED chips each of which emits a single color of light of red (R), green (G) or blue (B). The LED may include three different kinds of LED chips each of which emits a single color of light of C (cyan), M (magenta) or Y (yellow).

(24) In the above embodiments, the LEDs that emit white light are used. LEDs that emit red light, LEDs that emit blue light and LEDs that emit green light may be combined properly to be used.

(25) In the above embodiments, the LEDs are used as a point light source. A point-like light source other than the LED may be used.

(26) In the above embodiments, the LED that is a point light source is used as the light source. The point light source is not necessarily used as the light source but a linear light source such as a cold cathode tube or a hot cathode tube or a sheet-like light source such as an organic EL may be used as the light source.

(27) In the above embodiments, the diffuser lens that diffuses light from the LED is used as an optical lens. However, any optical lens other than the diffuser lens (for example, a collecting lens having a light collecting function) may be used.

(28) In the above embodiments, the diffuser lens is used as the optical component but an optical component (light diffusing component) other than lenses may be used.

(29) A screen size and a horizontal to vertical ratio of the liquid crystal display device may be altered if necessary.

(30) In the above embodiments, the liquid crystal panel and the chassis are arranged in a vertical position such that the short-side direction matches the vertical direction. However, the liquid crystal panel and the chassis are arranged in a vertical position such that the long-side direction matches the vertical direction.

(31) In the above embodiments, TFTs are used as switching components of the liquid crystal display device. However, the technology described above can be applied to liquid crystal display devices including switching components other than TFTs (e.g., thin film diode (TFD)). Moreover, the technology can be applied to not only color liquid crystal display devices but also black-and-white liquid crystal display devices.

(32) In the above embodiments, the liquid crystal display device including the liquid crystal panel as a display panel. The technology can be applied to display devices including other types of display components.

(33) In the above embodiments, the television receiver including the tuner is used. However, the technology can be applied to a display device without a tuner.

The invention claimed is:

1. A light source unit comprising:
a light source having a light emitting surface;
an optical component provided to face the light emitting surface;
a reflection member provided to face a surface of the optical component that is close to the light source and configured to reflect light; and
a restriction member projecting from one of the optical component and the reflection member toward another one of the optical component and the reflection member and configured to restrict positional relationship between the optical component and the reflection member.

2. The light source unit according to claim 1, wherein the restriction member is formed to have a gap between the restriction member and the other one of the optical component and the reflection member.

3. The light source unit according to claim 1, wherein the restriction member is formed to be in contact with the other one of the optical component and the reflection member without having a gap between the restriction member and the optical component.

4. The light source unit according to claim 1, wherein the restriction member includes a plurality of restriction members and the restriction members are provided with dispersed in a surface area of facing surfaces of the optical component and the reflection member.

5. The light source unit according to claim 4, wherein the restriction members are provided at equal intervals.

6. The light source unit according to claim 1, wherein the light source is a point light source that is formed in a point-like shape in a plan view.

7. The light source unit according to claim 6, wherein the restriction member is provided to be far away from the point light source in a plan view.

8. The light source unit according to claim 7, wherein the restriction member includes a plurality of restriction members and the restriction members are provided to have an equal distance from the point light source.

9. The light source unit according to claim 8, wherein the restriction members are provided at equal angular intervals.

10. The light source unit according to claim 7, further comprising a light source board having a mount surface on which the point light source is mounted and having the reflection member overlapped on the mount surface, wherein the reflection member includes a light source fitting hole through which the point light source is fitted through.

11. The light source unit according to claim 10, wherein the restriction member is provided to overlap an outer edge of the light source board in a plan view.

12. The light source unit according to claim 10, wherein the reflection member is greater in size than the light source board in a plan view.

13. The light source unit according to claim 10, wherein the optical component includes a mounting portion that projects toward the light source board and is configured to be mounted to the light source board, and the mounting portion is provided to be far away from the point light source in a plan view.

14. The light source unit according to claim 13, wherein the reflection member includes a mounting portion fitting hole through which the mounting portion is fitted through.

15. The light source unit according to claim 14, wherein a gap is formed between the mounting portion fitting hole and the mounting portion.

16. The light source unit according to claim 13, wherein the restriction member is provided integrally with the optical component and provided to be far away from the mounting portion on the optical component.

17. The light source unit according to claim 16, wherein the mounting portion includes a plurality of mounting portions and the restriction member includes a plurality of restriction members, and the mounting portions and the restriction members are provided alternately in a circumferential direction of the optical component.

18. The light source unit according to claim 17, wherein the mounting portions and the restriction members are provided at equal intervals.

19. The light source unit according to claim 17, wherein the mounting portions and the restriction members are provided to have an equal distance from the point light source.

20. The light source unit according to claim 13, wherein the restriction member is provided integrally with the optical component and formed continuously from the mounting portion.

21. The light source unit according to claim 20, wherein the restriction member is formed to surround the mounting portion.

22. The light source unit according to claim 13, wherein the restriction member is provided integrally with the optical component and in adjacent to the mounting portion on the optical component.

23. The light source unit according to claim 6, wherein the point light source is arranged at substantially a center of the optical component.

24. The light source unit according to claim 6, the point light source is an LED.

25. The light source unit according to claim 6, wherein the optical component is a light diffuser component configured to diffuse light.

26. The light source unit according to claim 1, wherein the restriction member is provided integrally with the optical component.

27. The light source unit according to claim 26, wherein the reflection member is provided to face the restriction member and includes a contact portion configured to come in contact with the restriction member.

28. The light source unit according to claim 26, wherein the reflection member has a contact hole through which the restriction member is fitted and the contact hole has a peripheral surface configured to come in contact with the restriction member.

29. The light source unit according to claim 28, wherein the restriction member is formed to be tapered to a distal end and has a tapered surface that faces a peripheral surface of the contact hole.

30. The light source unit according to claim 1, wherein the restriction member is provided integrally with the reflection member.

31. The light source unit according to claim 30, wherein the restriction member is a separately provided from the reflection member and is fixed to the reflection member to be provided integrally therewith.

32. The light source unit according to claim 1, wherein the restriction member has a curved surface facing the other one of the optical component and the reflection member.

33. The light source unit according to claim 32, wherein the restriction member has a spherical surface facing the other one of the optical component and the reflection member.

34. The light source unit according to claim 1, wherein the reflection member is greater in size than the optical component in a plan view.

35. The light source unit according to claim 1, wherein the optical component is an optical lens configured to diffuse or collect light.

36. The light source unit according to claim 35, wherein the optical lens is a diffuser lens configured to diffuse light.

37. A lighting device comprising:
the light source unit according to claim 1;
a chassis configured to house the light source unit therein; and
a chassis reflection member provided along an inner surface of the chassis and having an optical component fitting hole through which the optical component is fitted.

38. The lighting device according to claim 37, wherein the reflection member is provided in a space within the optical component fitting hole in a plan view and so as to overlap an edge portion of the optical component fitting hole in a plan view.

39. A display device comprising:
the lighting device according to claim 37; and
a display panel configured to provide display using light from the lighting device.

40. The display device according to claim 39, wherein the display panel is a liquid crystal panel using liquid crystals filled between base boards.

41. A television receiver comprising the display device according to claim 39.

* * * * *